(12) United States Patent
Kobayashi

(10) Patent No.: US 8,243,863 B2
(45) Date of Patent: Aug. 14, 2012

(54) SEMICONDUCTOR DEVICE

(75) Inventor: Hidetomo Kobayashi, Atsugi (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 523 days.

(21) Appl. No.: 12/553,131

(22) Filed: Sep. 3, 2009

(65) Prior Publication Data

US 2010/0073137 A1 Mar. 25, 2010

(30) Foreign Application Priority Data

Sep. 19, 2008 (JP) .................... 2008-241436

(51) Int. Cl.
*H04B 1/10* (2006.01)
(52) U.S. Cl. ........................................ 375/349
(58) Field of Classification Search .......... 375/219, 375/316, 349
See application file for complete search history.

(56) References Cited

U.S. PATENT DOCUMENTS

| | | | |
|---|---|---|---|
| 5,390,357 A | 2/1995 | Nobusawa et al. | |
| 6,213,402 B1 | 4/2001 | Reiner | |
| 6,442,215 B1 | 8/2002 | Amtmann | |
| 6,611,224 B1* | 8/2003 | Nysen et al. | 342/42 |
| 6,848,620 B2 | 2/2005 | Nakane et al. | |
| 7,877,068 B2 | 1/2011 | Atsumi et al. | |
| 2006/0192019 A1 | 8/2006 | Kato et al. | |
| 2008/0126560 A1* | 5/2008 | Takayama et al. | 709/233 |
| 2008/0153450 A1* | 6/2008 | Atsumi et al. | 455/337 |
| 2009/0158110 A1* | 6/2009 | Park et al. | 714/748 |
| 2010/0104040 A1* | 4/2010 | Seki | 375/267 |

FOREIGN PATENT DOCUMENTS

| | | |
|---|---|---|
| EP | 1251458 A | 10/2002 |
| JP | 2000-172806 A | 6/2000 |
| JP | 2000-510633 A | 8/2000 |
| JP | 2002-521867 A | 7/2002 |
| JP | 2002-319007 A | 10/2002 |
| JP | 2006-268838 A | 10/2006 |
| JP | 2008-182687 A | 8/2008 |
| WO | WO-00/04686 A | 1/2000 |

(Continued)

OTHER PUBLICATIONS

International Search Report (Application No. PCT/JP2009/064898) Dated Oct. 13, 2009.

(Continued)

*Primary Examiner* — Don N Vo
(74) *Attorney, Agent, or Firm* — Eric J. Robinson; Robinson Intellectual Property Law Office, P.C.

(57) ABSTRACT

To provide a semiconductor device which can transmit/receive data to/from a reader/writer without interruption of operation by the reader/writer or the like. A semiconductor device capable of wireless communication includes an antenna circuit, a first demodulation signal generation circuit which demodulates a signal whose modulation factor is from 95% to 100%, both inclusive, a second demodulation signal generation circuit which demodulates a signal whose modulation factor is from 95% and 100%, both inclusive and from 10% and 30%, both inclusive and a logic circuit which selects one of a demodulation signal from the first circuit and a demodulation signal from the second circuit. When the antenna circuit receives an electromagnetic wave, the logic circuit selects the demodulation signal from the second circuit, and when the antenna circuit transmits an electromagnetic wave, the logic circuit selects the demodulation signal from the first circuit.

12 Claims, 15 Drawing Sheets

FOREIGN PATENT DOCUMENTS

WO  WO-2008/078661 A  7/2008

OTHER PUBLICATIONS

Written Opinion (Application No. PCT/JP2009/064898) Dated Oct. 13, 2009.

International Search Report (Application No. PCT/JP2007/074603) Dated Apr. 1, 2008.
Written Opinion (Application No. PCT/JP2007/074603) Dated Apr. 1, 2008.

* cited by examiner

FIG. 14F

SEMICONDUCTOR DEVICE

TECHNICAL FIELD

The present invention relates to a semiconductor device which can transmit and receive information without contact by utilizing wireless communication, and relates to a card on which the semiconductor device is mounted.

BACKGROUND ART

In recent years, individual recognition technology in which individual identification information is given to an individual object to clarify information such as a history of the object has attracted attention. In particular, the development of semiconductor devices which can transmit and receive data without contact by utilizing wireless communication through a radio wave has been advanced. Such semiconductor devices are referred to as an IC tag, an RFID tag, and the like, which have begun to be used for management of articles in markets, or the like.

In general, many of objects which are referred to as an RFID tag and the like that have been put into practical use include an element formation layer and an antenna layer each having a circuit formed of a transistor or the like. Such semiconductor devices capable of wireless communication perform wireless communication with a reader/writer through an electromagnetic wave, so that the semiconductor devices can be operated by receiving power from a power supply and data from the reader/writer. In wireless communication between the reader/writer and the semiconductor device, in general, a transmission side device (a reader/writer) transmits a modulated carrier wave and a reception side device (a semiconductor device) demodulates the carrier wave, so that data is extracted and information is transmitted and received.

In the semiconductor devices capable of wireless communication, there is an amplitude modulation method (an amplitude shift keying (ASK) modulation method) as one of methods which modulate a carrier wave. An ASK modulation method is a method which transmits information by generation of a difference in amplitude of a carrier wave and use of this amplitude difference as a modulation signal. Here, when an amplitude in a low state (a difference between a signal line (an amplitude peak) and a reference line (an amplitude center) is a and an amplitude in a high state (a difference between a signal line (an amplitude peak) and a reference line (an amplitude center) is b, a modulation factor m can be expressed as $m=(b-a)/(b+a)$. The transmission side device can decide a modulation factor by a method in accordance with both the transmission side device and the reception side device which perform wireless communication. The reception side device receives a modulation signal whose modulation factor is decided by the transmission side device, and demodulates the modulation signal.

However, since the semiconductor device capable of wireless communication includes an integrated circuit provided with a minute semiconductor element, a problem of variation or the like of element characteristics arises and it has been difficult to manufacture a semiconductor device having favorable electrical characteristics. Thus, a semiconductor device having favorable electrical characteristics by various improvements has been proposed (for example, see Reference 1).

Note that the semiconductor device capable of wireless communication performs transmission, reception, and the like of a signal in accordance with a communication method based on various standards as communication thereof. With a communication method which is standardized with ISO/IEC 15693 which is a standard of a vicinity-type wireless IC card, a 13.56 MHz carrier wave is modulated in order to obtain a modulation factor of 100% or 10%, and data is encoded with a pulse position modulation method which identifies data by change of a modulation position of a pulse position. There are ISO/IEC 14443 (TYPE-A) and ISO/IEC 18000-3 as standards similar to ISO/IEC 15693. In ISO/IEC 14443 (TYPE-A), it is prescribed that a carrier wave whose modulation factor is 100% is expressed with an amplitude whose initial amplitude (an amplitude in a state without modulation) is less than or equal to 5%.

Thus, various methods are considered in order to demodulate a signal whose modulation factor is 10% (for example, see Reference 2).

REFERENCES

Reference 1: Japanese Published Patent Application No. 2006-268838

Reference 2: Japanese Published Patent Application No. 2000-172806

DISCLOSURE OF INVENTION

In general, a reception side device includes an analog circuit having a demodulation circuit, a power supply circuit, a modulation circuit, and the like, and a digital circuit connected to the analog circuit. As an output of the demodulation circuit, a demodulation signal is output from the analog circuit and input into the digital circuit. When a carrier wave whose modulation factor is 100% is used for wireless communication, a state in which an amplitude is 0 (a state in which an amplitude peak and a reference line accord with each other) is included. Therefore, in particular, in a semiconductor device which operates by generating power from a power supply through a received electromagnetic wave, it is difficult to obtain power from a power supply when an amplitude of a carrier wave whose modulation factor is 100%, which is used for wireless communication, is 0. Accordingly, the operation of the semiconductor device is interfered. In such a semiconductor device, a certain amplitude is secured so as to supply power with the use of a carrier wave whose modulation factor is small (for example, a carrier wave whose modulation factor is 10%); thus, the semiconductor device can be operated.

FIG. 5 illustrates a circuit configuration of a general demodulation circuit which demodulates a carrier wave whose modulation factor is 100%. The circuit illustrated in FIG. 5 includes an input portion 400, an output portion 416, a first diode 404, a second diode 406, a first resistor 408, a second resistor 412, a first capacitor 402, a second capacitor 410, and a third capacitor 414. In the circuit illustrated in FIG. 5, the input portion 400 is connected to one end of the first capacitor 402. The other end of the first capacitor 402 is connected to an anode of the first diode 404 and a cathode of the second diode 406. A cathode of the first diode 404 is connected to each of one ends of the first resistor 408, the second capacitor 410, and the second resistor 412. The other end of the second resistor 412 is connected to one end of the third capacitor 414 and the output portion 416. Further, an anode of the second diode 406, each of the other ends of the first resistor 408, the second capacitor 410, and the third capacitor 414 are connected to a reference potential ($V_{SS}$).

Although the circuit illustrated in FIG. 5 can demodulate a carrier wave whose modulation factor is large (for example, a carrier wave whose modulation factor is 100%), it is difficult to demodulate a carrier wave whose modulation factor is small (for example, a carrier wave whose modulation factor is 10%).

Thus, the following are provided in a circuit configuration proposed in Reference 2: a first demodulation means which regenerates data included in a type A (ISO 14443-A) 100% ASK signal (a signal whose modulation factor is 100%) from a signal received by a coil; a second demodulation means which regenerates data included in a type B (ISO 14443-B) 10% ASK signal (a signal whose modulation factor is 10%) from the signal received by the coil; and a selector means which selects regenerated signals. Further, in order to control the selector means, a control means which generates a selection control signal by input of the regenerated signal and a transmission signal of the first demodulation means is provided.

Then, the regenerated signal of the first demodulation means or the regenerated signal of the second demodulation means is selected by the selector means. In addition, the selector means is controlled by the control means, so that it selects the regenerated signal of the second demodulation means (or the first demodulation means). When the first demodulation means detects regeneration data, the selector means selects the regenerated signal of the first demodulation means (or the second demodulation means) from then.

In Reference 2, the selector means is usually set so as to select the regenerated signal of the second demodulation means (or the first demodulation means). The regenerated signal of the first demodulation means (100% ASK signal regenerated by the first demodulation means) is input to the control means, and a selection control signal for selecting the regenerated signal of the first demodulation means (100% ASK signal regenerated by the first demodulation means) is output from the control means to the selector means. When the selection control signal is input to the selection means, the selector means selects the regenerated signal of the first demodulation means from then. With this structure, the regenerated signal of the first demodulation means is selected; therefore, even when the coil receives a signal transmitted to a reader/writer again, the signal is not demodulated again.

However, in the structure disclosed in Reference 2, when a 10% ASK signal which is received by the coil is input to the first demodulation means after the regenerated signal of the first demodulation means is selected by selection means, the data included in the 10% ASK signal cannot be regenerated in the first demodulation means which regenerates data included in a 100% ASK signal. In addition, even when the data included in the 10% ASK signal is regenerated, the 10% ASK signal is not guaranteed to be successively and stably regenerated due to the variation in characteristics of transistors which are included in the first demodulation means.

In Reference 2, when a transmission signal from a card to a reader/writer is generated, the regenerated signal of the second demodulation means (or the first demodulation means) is selected by the selector means which is controlled by the control means. Then, in accordance with the selected regenerated signal, a read/write control means reads and writes data from and to a nonvolatile memory such as an EEPROM.

By the communication method which is standardized with the ISO/IEC 15693, as an anti-collision measure in the case where a reader/writer and a plurality of cards (or chips) transmit and receive data to and from each other, a data communication region is set to be divided into a plurality of regions at given time intervals and data is set to be transmitted and received by any one of the divided regions. By this communication method, data is transmitted and received by the other cards in some cases in a region which is different from a region where a certain card transmits and receives data.

However, in the structure disclosed in Reference 2, since the regenerated signal of the second demodulation means (or the first demodulation means) is selected using a signal transmitted by the card (or chip) by selection means, the signal transmitted by the card (or chip) is not demodulated by the second demodulation means (or the first demodulation means) even when the signal is received again. Meanwhile, signals transmitted from the other cards (or chips) to the reader/writer are received and demodulated by the second demodulation means (or the first demodulation means), whereby the card might be disabled or malfunction.

In view of the foregoing problems, an object of one embodiment of the present invention is to provide a semiconductor device which can transmit and receive data to and from a reader/writer without interruption of operation by a transmission signal to the reader/writer, and a card (or chip) having the semiconductor device.

In addition, another object of one embodiment of the present invention is to provide a card (or chip) which can stably transmit and receive data to and from a reader/writer even in the case where there is a plurality of cards (or chips) on which semiconductor devices that can transmit and receive data to and from the reader/writer are mounted.

According to one embodiment of the present invention, a semiconductor device includes an antenna circuit, a first demodulation signal generation circuit, a second demodulation signal generation circuit, and a logic circuit which selects a demodulation signal from the first demodulation signal generation circuit or a demodulation signal from the second demodulation signal generation circuit. Specifically, the semiconductor device includes the first demodulation signal generation circuit which generates a demodulation signal from a carrier wave whose modulation factor is 100%, the second demodulation signal generation circuit which generates a demodulation signal from a carrier wave whose modulation factor is 10% and a carrier wave whose modulation factor is 100%, and the logic circuit to which a demodulation signal from the first demodulation signal generation circuit and a demodulation signal from the second demodulation signal generation circuit are input and which selects either of the demodulation signals.

Further, when the antenna circuit receives data from the reader/writer, the logic circuit selects the demodulation signal from the second demodulation signal generation circuit. When the antenna circuit transmits data to the reader/writer, the logic circuit selects the demodulation signal from the first demodulation signal generation circuit.

Note that the logic circuit refers to a circuit formed of a plurality of circuits which are provided in order to achieve a certain object in the digital circuit, in this specification.

Note that "the case where a modulation factor is 10%" and "the case where a modulation factor is 100%" are described in this specification; however, a range of a modulation factor which is greater than or equal to 10% and less than or equal to 30% is typically described as "the case where a modulation factor is 10%". In addition, a range of a modulation factor which is greater than or equal to 95% and less than or equal to 100% is typically described as "the case where a modulation factor is 100%".

According to one embodiment of the present invention, a semiconductor device includes a first demodulation signal generation circuit which demodulates a carrier wave whose modulation factor is 100%, a second demodulation signal generation circuit which demodulates a carrier wave whose modulation factor is 10% and a carrier wave whose modulation factor is 100%, and a logic circuit which selects a demodulation signal from the first demodulation signal generation circuit or a demodulation signal from the second demodulation signal generation circuit. The semiconductor device can demodulate both the carrier wave whose modulation factor is 100% and the carrier wave whose modulation factor is 10%.

Further, when an antenna circuit transmits data, a signal demodulated by the first demodulation signal generation circuit is selected by the logic circuit, and when the antenna circuit receives data, a signal demodulated by the second demodulation signal generation circuit is selected by the logic circuit. Therefore, even when the semiconductor device receives a transmission signal to the reader/writer, the transmission signal is not demodulated again, so that the operation of the semiconductor device is not hindered by the transmission signal. Thus, in a card (or chip) on which the semiconductor device is mounted, the card can be prevented from being disabled or malfunctioning due to the card itself, and data can be stably transmitted and received to and from the reader/writer.

Further, when the antenna circuit transmits data, the signal demodulated by the first demodulation signal generation circuit is selected by the logic circuit, and when the antenna circuit receives data, the signal demodulated by the second demodulation signal generation circuit is selected by the logic circuit. Therefore, even in the case where there is a plurality of cards (or chips) other than a card on which the semiconductor device is mounted (hereinafter referred to as one card) in a range where the one card is operated by a magnetic field that is generated by the reader/writer, transmission signals from the other cards are not demodulated even when the transmission signals are received by the one card. Accordingly, the one card can be prevented from being disabled or malfunctioning due to the other cards, whereby data can be stably transmitted and received to and from the reader/writer.

BRIEF DESCRIPTION OF DRAWINGS

FIGS. 14A to 14F are diagrams of the present invention each illustrating Embodiment 3.

BEST MODE FOR CARRYING OUT THE INVENTION

Hereinafter, embodiments will be fully described by way of embodiments with reference to the accompanying drawings. However, the present invention can be implemented with many different modes, and various changes and modifications for the modes and details thereof will be apparent to those skilled in the art unless such changes and modifications depart from the spirit and scope of the present invention. Therefore, the present invention should not be interpreted as being limited to what is described in the embodiments described below.

Embodiment 1

In this embodiment, an example of a structure of a semiconductor device will be described with reference to FIG. 1, FIG. 2, FIG. 3, FIG. 4, FIG. 5, FIG. 6, FIGS. 7A to 7E, FIGS. 8A to 8D, FIG. 9, FIG. 10, FIGS. 11A and 11B, FIG. 12, and FIGS. 13A to 13E.

Figure 2:
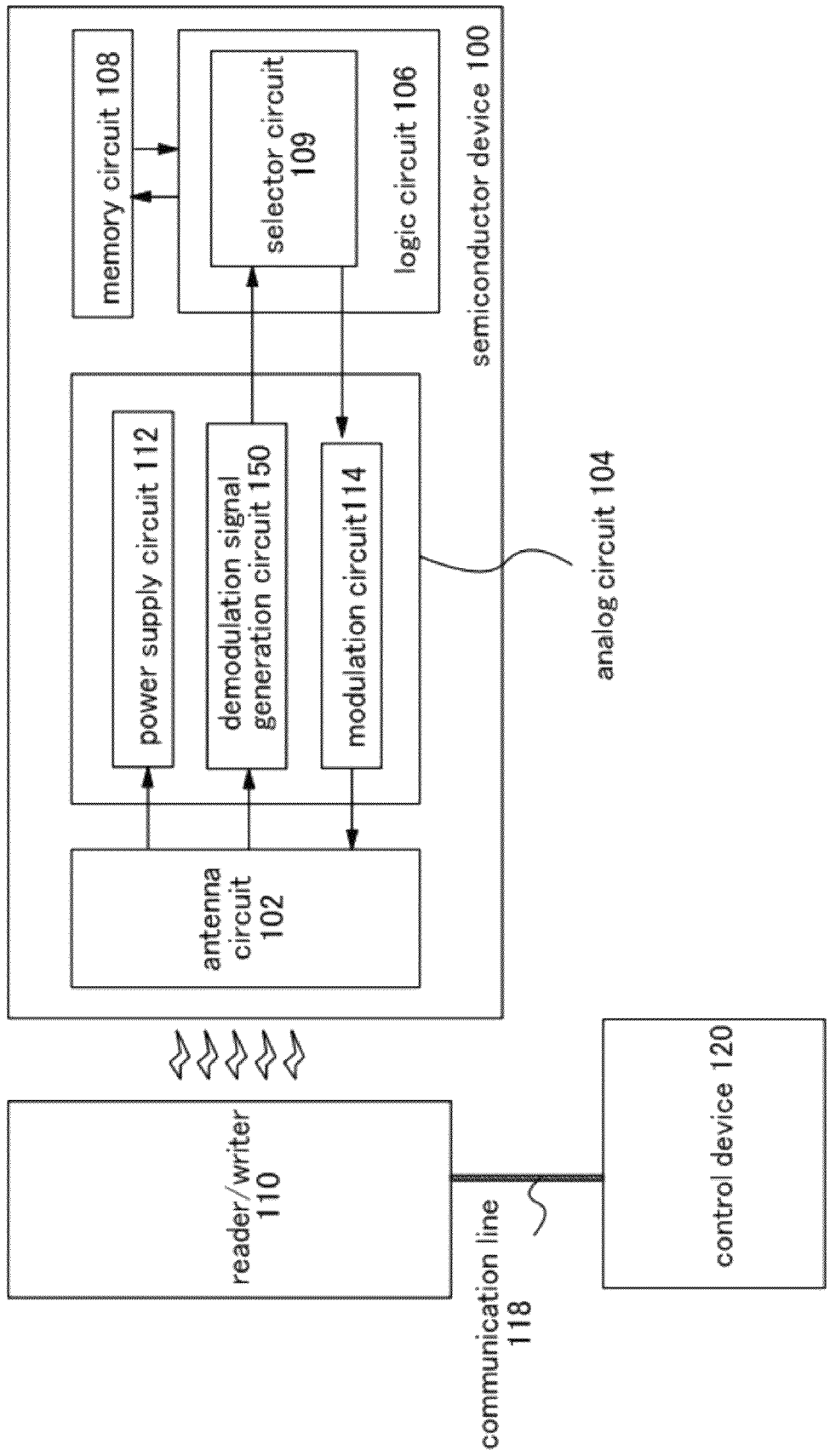
FIG. 2 illustrates an example of a semiconductor device according to one embodiment of the present invention.

A semiconductor device of this embodiment is illustrated in FIG. 2. In FIG. 2, a semiconductor device 100 transmits and receives data wirelessly to and from a reader/writer 110 by an electromagnetic wave. Further, the semiconductor device 100 is wirelessly supplied with power from the reader/writer 110.

The reader/writer 110 is preferably connected to a control device 120 through a communication line 118. The control device 120 controls communication between the reader/writer 110 and the semiconductor device 100.

The semiconductor device 100 includes an antenna circuit 102, an analog circuit 104, a logic circuit 106, and a memory circuit 108. The analog circuit 104 has a demodulation signal generation circuit 150, a modulation circuit 114, and a power supply circuit 112. The logic circuit 106 includes a selector circuit 109.

Alternatively, the semiconductor device 100 does not include an antenna but does include a wiring used to connect to an external antenna. In this case, the antenna which is separately manufactured is connected to the wiring. A connection terminal (a terminal electrode) which is electrically connected to the wiring may be used to connect the wiring and the antenna.

Note that the semiconductor device 100 is not limited to the above structure, and a central processor unit (hereinafter referred to as a CPU), a sensor element, an interface circuit, a clock generation circuit, or the like may be included.

Note that the clock generation circuit refers to a circuit which generates and supplies to each circuit a clock signal having a frequency necessary for operations of the logic circuit 106, the memory circuit 108, and the like based on an AC induced voltage which is generated in the antenna circuit 102. An oscillation circuit or a frequency divider circuit may be used for the clock generation circuit.

A semiconductor device capable of wireless communication is roughly classified into an active type which incorporates a power supply (a power storage portion) and a passive type which drives by utilization of power of a radio wave (or an electromagnetic wave) from external. Further, there is a type referred to as semi-active which charges a power supply (a power storage portion) by utilization of power of a radio wave (or an electromagnetic wave) from external. This embodiment describes the case where the semiconductor device 100 is the passive type in which an electromagnetic wave is received from the reader/writer 110 and power of the electromagnetic wave is supplied to drive the semiconductor device; however, this embodiment is not limited thereto. That is, the semiconductor device 100 may be the active type.

In the electromagnetic wave transmitted from the reader/writer 110, a carrier wave having a certain frequency is modulated from a sub-carrier wave. A signal included in the sub-carrier wave is a binarized digital signal which is transmitted to the semiconductor device 100 from the reader/writer 110. As to a modulation method of a carrier wave, there are an amplitude shift keying (ASK) modulation method which changes amplitude, a frequency shift keying (FSK) modulation method which changes a frequency, and a phase shift keying (PSK) modulation method which changes a phase. In this embodiment, the case in which an electromagnetic wave modulated by the ASK modulation method is demodulated is described.

The antenna circuit 102 includes an antenna and a capacitor. The antenna circuit 102 receives a radio wave (or an electromagnetic wave) which is transmitted from the reader/writer 110, and inputs the signal obtained at this time into each of the power supply circuit 112, a first demodulation signal generation circuit 201, and a second demodulation signal generation circuit 202 included in the analog circuit 104 (see FIG. 3). Further, the antenna circuit 102 receives a signal whose carrier wave is modulated from the modulation circuit 114, and transmits a response signal to the reader/writer 110.

The antenna circuit 102 preferably having an antenna and a rectifier circuit receives an electromagnetic wave, which is transmitted from the reader/writer 110, and generates an AC induced voltage. The induced voltage becomes power from a power supply of the semiconductor device 100 and also includes data transmitted from the reader/writer 110.

The shape of the antenna that can be used for this embodiment is not particularly limited. Therefore, an electromagnetic coupling method, an electromagnetic induction method, an electromagnetic wave method, or the like can be used as a transmission method of a signal for the antenna circuit 102 included in the semiconductor device 100. The transmission method may be selected as appropriate by a practitioner in consideration of the intended use of the device. Thus, an antenna with an optimum length and shape may be provided in accordance with the transmission method. In this embodiment, an electromagnetic induction method having a communication frequency of 13.56 MHz is preferably used as the signal transmission method.

In the case of applying an electromagnetic coupling method or an electromagnetic induction method (for example, a 13.56 MHz band) as the transmission method, a conductive film which functions as the antenna is formed in an annular form (for example, a loop antenna) or a helical form (for example, a spiral antenna) in order to utilize electromagnetic induction that occurs with changes in magnetic density.

In the case of using a microwave method (for example, UHF band (860 MHz to 960 MHz), 2.45 GHz band, or the like) which is one kind of radio wave methods as the transmission method, the length and shape of the conductive film which functions as the antenna may be set as appropriate in consideration of the wavelength of radio waves used for the signal transmission. For example, the conductive film which functions as an antenna can be formed into a linear shape (for example, a dipole antenna), a flat shape (for example, a patch antenna), or the like. The shape of the conductive film which functions as an antenna is not limited to a linear shape, and the conductive film which functions as an antenna may be formed in a curved-line shape, a meander shape, or a combination thereof, in consideration of a wavelength of an electromagnetic wave.

Figure 13A:
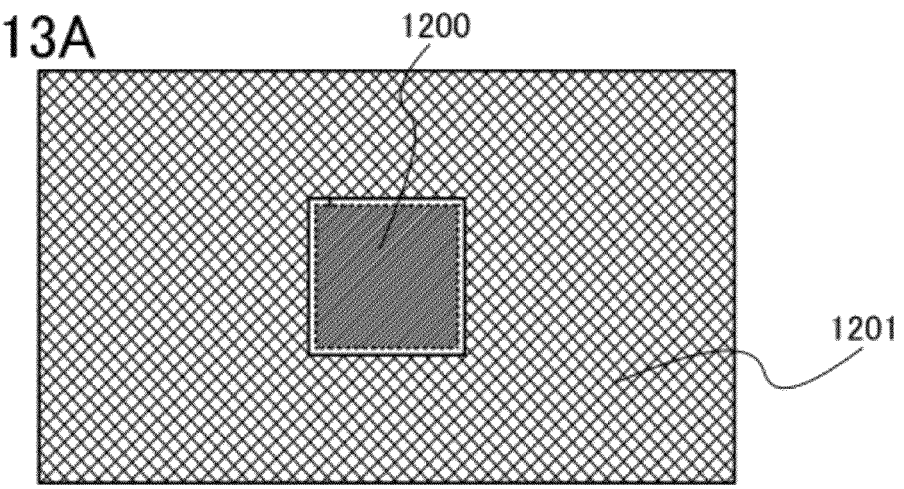
FIGS. 13A to 13E each illustrate an example of the shape of the antenna provided in the antenna circuit of a semiconductor device according to one embodiment of the present invention.
Figure 13B:
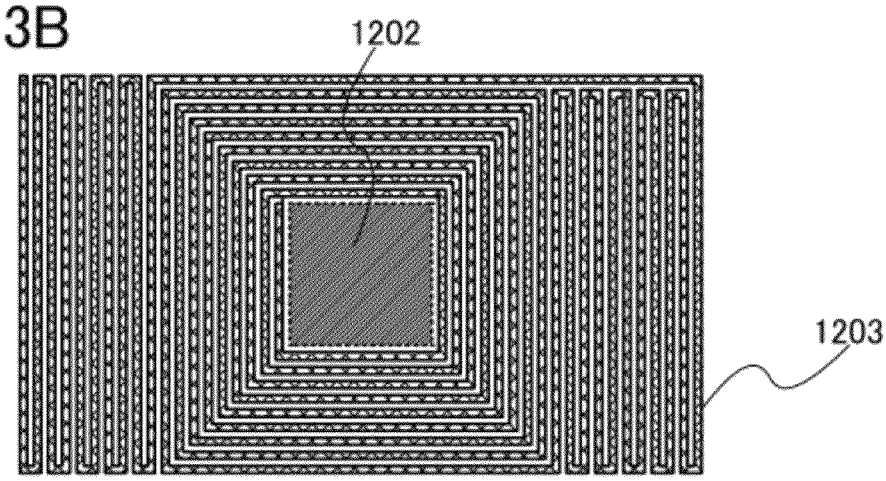
Figure 13C:
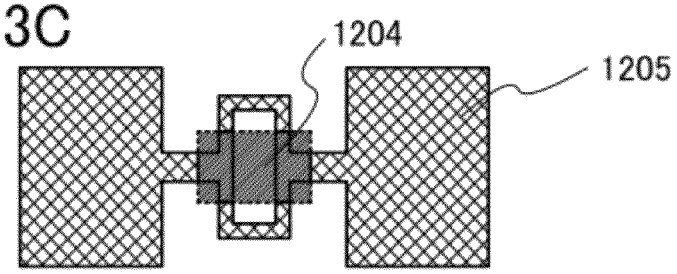
Figure 13D:
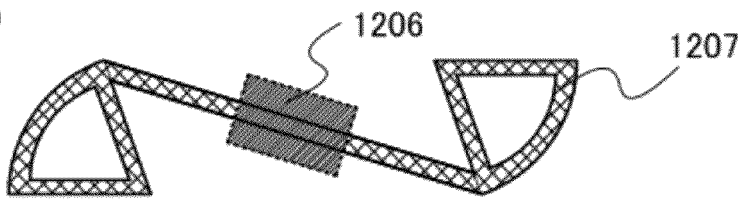
Figure 13E:
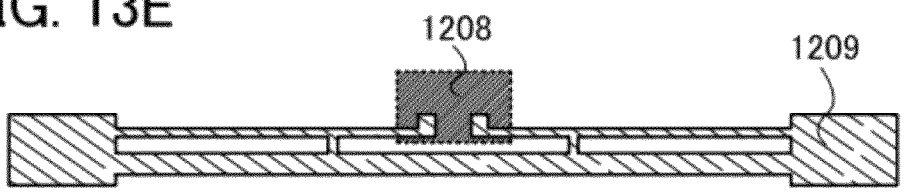
Figure 14A:
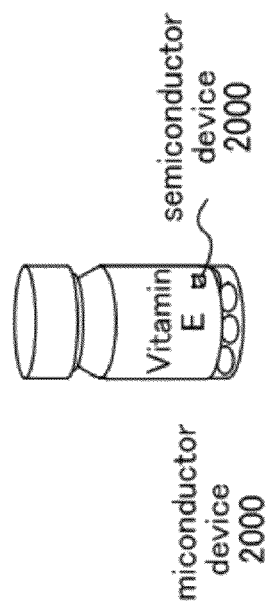
Figure 14C:
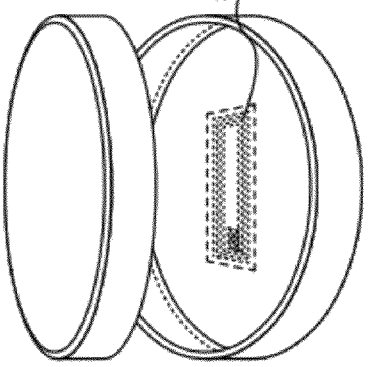
Figure 14E:
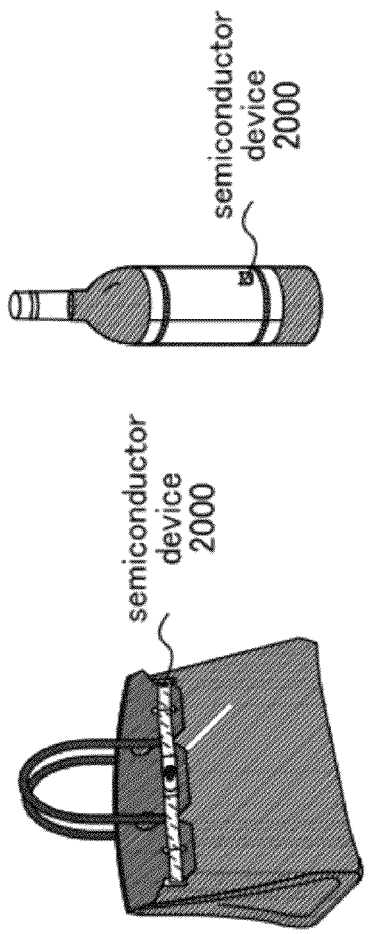
Figure 14B:
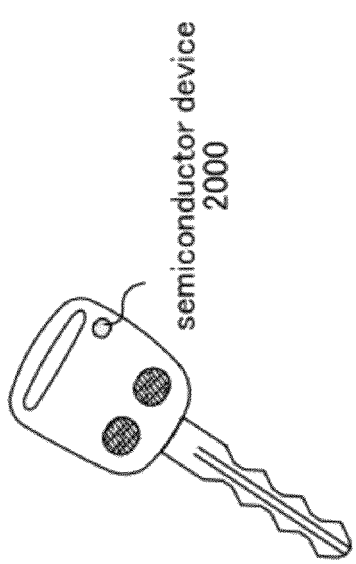
Figure 14D:
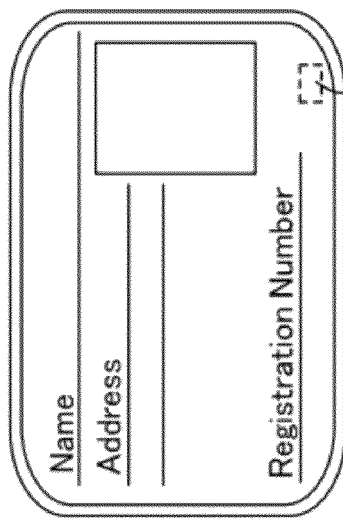

FIGS. 13A to 13E each illustrate an example of the shape of the antenna provided in the antenna circuit 102. For example, as illustrated in FIG. 13A, a layout may be used in which an antenna 1201 is disposed all around a chip 1200 provided with a signal processing circuit. Alternatively, as illustrated in FIG. 13B, a thin antenna 1203 may be arranged all around a chip 1202 provided with a signal processing circuit. Further, as illustrated in FIG. 13C, a layout may be used in which an antenna whose shape is like that of an antenna 1205 for receiving high-frequency electromagnetic waves is disposed for a chip 1204 provided with a signal processing circuit. Moreover, the shape of an antenna may be arranged like that of an antenna 1207, which is omnidirectional (can receive signals from any direction) in 180°, with respect to a chip 1206 provided with a signal processing circuit, as illustrated in FIG. 13D. As a further alternative, as illustrated in FIG. 13E, a layout may be used in which an antenna whose shape is like that of an antenna 1209 with a long rod shape is disposed for a chip 1208 provided with a signal processing circuit. The antenna circuit 102 may be formed by combination of the antennas with the above shapes.

In FIGS. 13A to 13E, a connection method between the chip 1200 or the like provided with a signal processing circuit and the antenna 1201 or the like is not particularly limited as long as a signal can be transmitted and received between the chip and the antenna. By giving FIG. 13A as an example, the antenna 1201 and the chip 1200 provided with a signal processing circuit are connected to each other by wire bonding or bump bonding. Alternatively, part of the chip may be used as an electrode to be attached to the antenna 1201. With this method, the chip 1200 can be attached to the antenna 1201 with the use of an anisotropic conductive film (hereinafter referred to as ACF).

Further, an appropriate length of the antenna differs depending on the frequency of a signal to receive. In the case where, for example, a frequency of 2.45 GHz is used, the length of the antenna may be approximately 60 nm (a half of the wavelength) or approximately 30 mm (a quarter of the wavelength).

Figure 4:
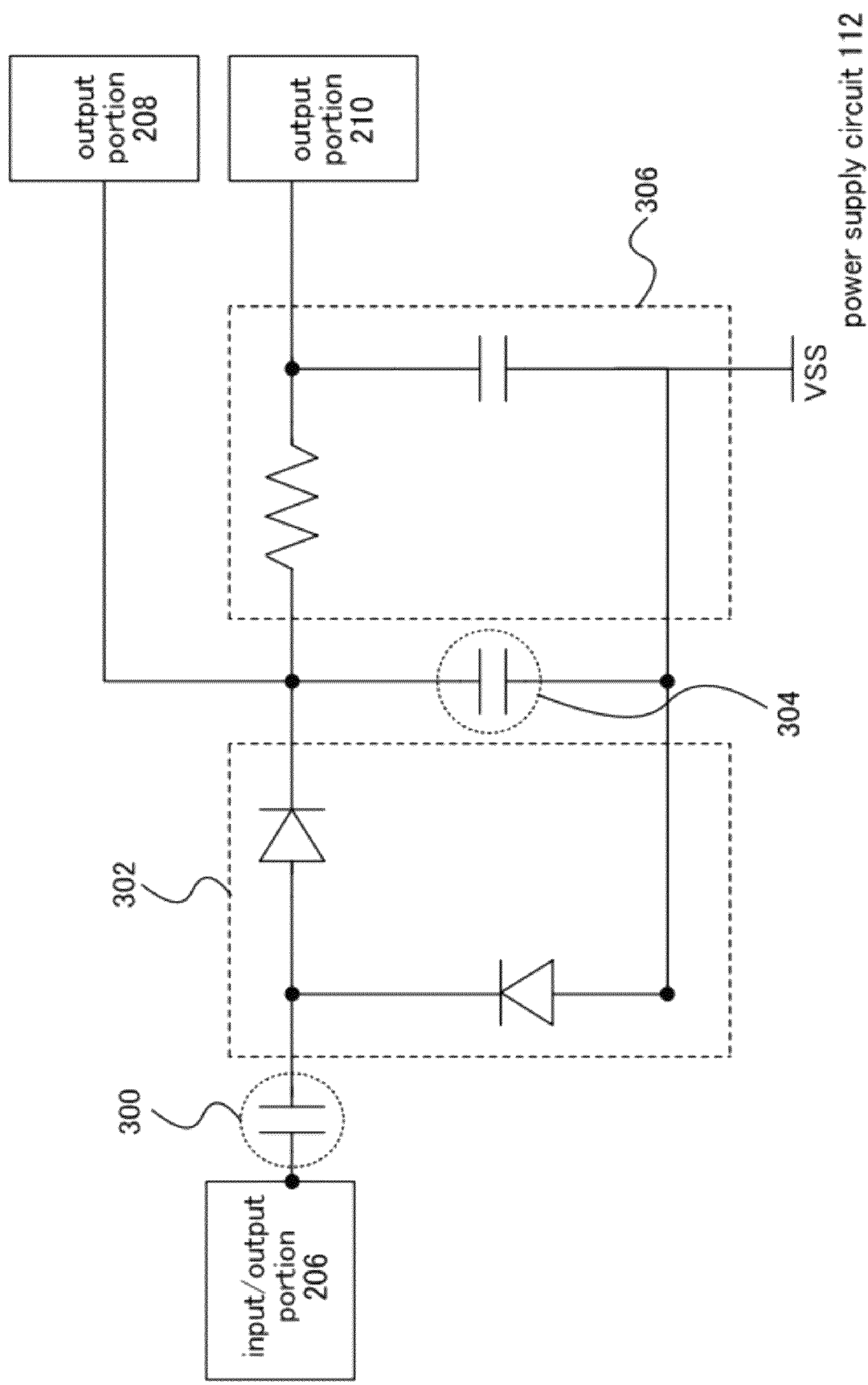
FIG. 4 illustrates an example of a power supply circuit of a semiconductor device according to one embodiment of the present invention.

In FIG. 4, the power supply circuit 112 rectifies an induced voltage, which is generated in the antenna circuit 102, by a diode or the like, and stabilizes the induced voltage with the use of a capacitor, thereby adjusting so as to maintain a stable potential having a certain potential difference from a reference potential (a potential of a reference line).

The logic circuit 106 performs the following operations in accordance with a signal demodulated by the demodulation signal generation circuit 150: analyzing instructions; controlling input and output of data in the memory circuit 108; outputting data to be transmitted to the outside to the modulation circuit 114; and the like. The logic circuit 106 preferably includes a decoding circuit, an information judging circuit, or the like, in addition to a circuit which generates a signal for controlling the memory circuit 108. Further, the logic circuit 106 may include a circuit which converts part or all of data extracted from the memory circuit 108, which is transmitted from the semiconductor device 100 to the reader/writer 110, into an encoded signal.

First, the logic circuit 106 receives a power supply voltage, two types of demodulation signals (a first demodulation signal and a second demodulation signal), and a reset signal which are supplied from the analog circuit 104. Then, the first demodulation signal or the second demodulation signal is selected by the selector circuit 109 in accordance with the condition of the waveform of the first demodulation signal, whereby a demodulation signal from the demodulation signal generation circuit to be used is determined. Next, the demodulation signal selected by the selector circuit 109 is transmitted to another circuit included in the logic circuit 106, and an instruction which is given so that the semiconductor device 100 operates in accordance with the content of data included in the selected demodulated signal is executed. For example, when the content of data included in the selected demodulation signal is to "reply to the reader/writer 110 with data in the memory circuit 108", the data is obtained by accessing the memory circuit 108 and transmitted to a modulation circuit 204.

The memory circuit 108 includes a memory element and stores at least unique data (individual identification information or the like) in the semiconductor device 100. Writing and reading of data in the memory circuit 108 are controlled by a memory control circuit 132 (see FIG. 1) included in the logic circuit 106.

The memory circuit 108 includes one or more of an organic memory, a dynamic random access memory (DRAM), a static random access memory (SRAM), a ferroelectric random access memory (FeRAM), a mask read only memory (ROM), a programmable read only memory (PROM), an electrically programmable read only memory (EPROM), an electrically erasable programmable read only memory (EEPROM), and a flash memory.

An organic memory has a simple structure in which a layer including an organic compound is interposed between a pair of conductive layers; therefore, it has at least two advantages. One is that a manufacturing process can be simplified, which allows cost reduction. The other advantage is that it is easy to reduce the area of the memory circuit and increase in capacitor can be realized easily because a stack which is easily downsized is used. Therefore, it is preferable to use the organic memory for the memory circuit 108.

As long as the memory content of the memory element is unique data (individual identification information or the like) in the semiconductor device 100, a nonvolatile memory which can store memory without being supplied with power is preferably used. On the other hand, as long as temporary memory used in processing performed by the semiconductor device 100 is stored, a volatile memory may be used. Particularly in the case of a so-called passive type in which the semiconductor device 100 has no cell, a nonvolatile memory is preferably used. Further, in consideration of security, a non-rewritable memory is preferably used to store the unique data in the semiconductor device 100.

The analog circuit 104 has the demodulation signal generation circuit 150 and the modulation circuit 114. The demodulation signal generation circuit 150 demodulates and extracts data included in the induced voltage which is generated in the antenna circuit 102. The modulation circuit 114 transmits load modulation to the antenna circuit 102 in accordance with a signal from the logic circuit 106.

Figure 3:
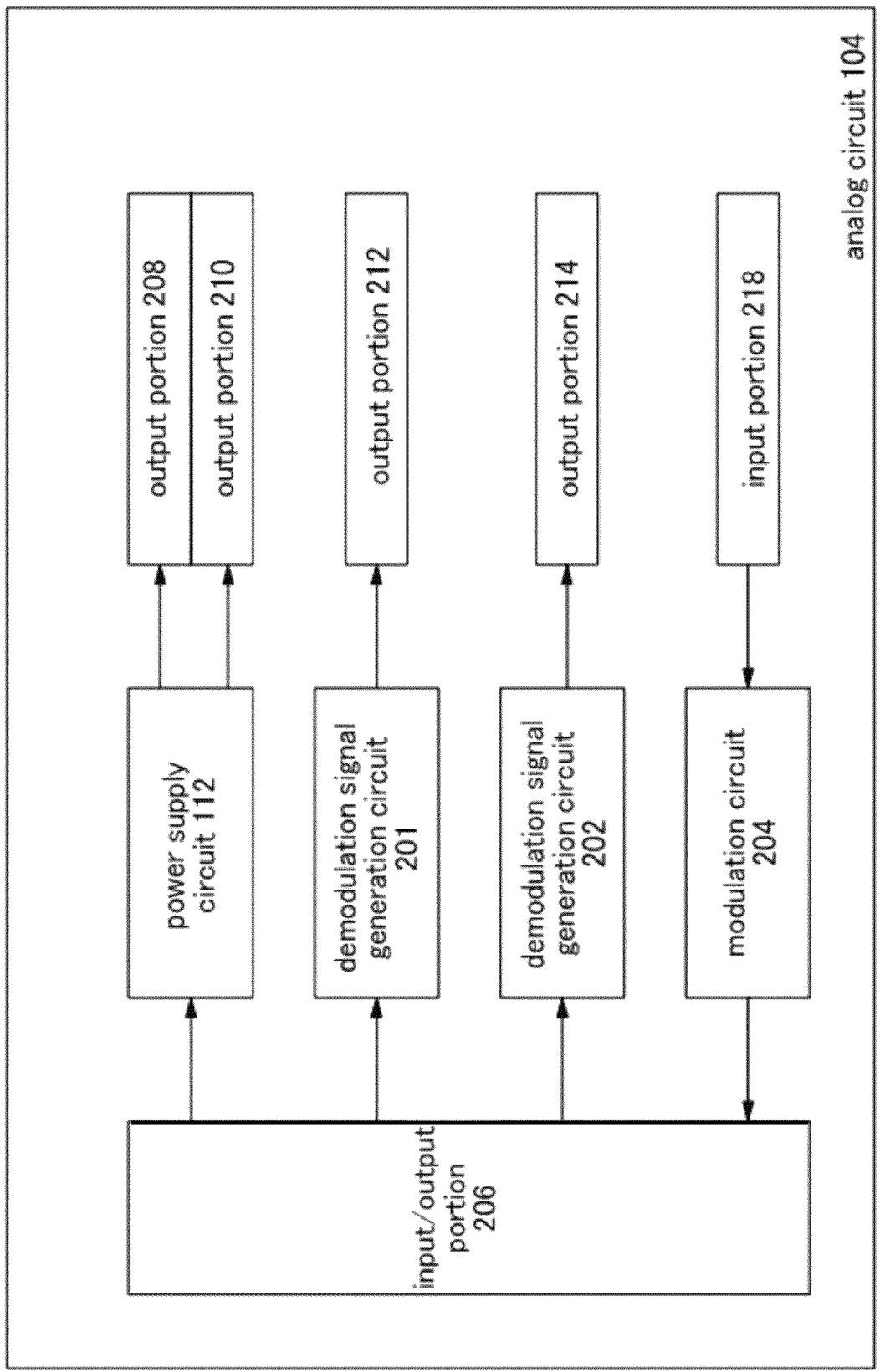
FIG. 3 illustrates an example of a semiconductor device according to one embodiment of the present invention.

The analog circuit 104 in FIG. 2 is described in detail with reference to FIG. 3. The analog circuit 104 includes the power supply circuit 112, the first demodulation signal generation circuit 201, the second demodulation signal generation circuit 202, the modulation circuit 204, an input/output portion 206, a first output portion 208, a second output portion 210, a third output portion 212, a fourth output portion 214, and an input portion 218.

The analog circuit 104 generates a power supply voltage, a first demodulation signal, a second demodulation signal, and a reset signal from an output signal of the antenna circuit 102. The input/output portion 206 is connected to the antenna circuit 102, and receives and transmits a carrier wave. The first output portion 208 is connected to all the circuit blocks, and supplies the power supply voltages thereto. The second output portion 210 is connected to all the circuit blocks, and supplies the reset signals thereto. The third output portion 212 is connected to the selector circuit 109 included in the logic circuit 106 and outputs the first demodulation signal. The fourth output portion 214 is connected to the selector circuit 109 included in the logic circuit 106 and outputs the second demodulation signal. The input portion 218 is connected to the logic circuit 106, and inputs thereinto a response signal which is modulated by the modulation circuit 204. The first demodulation signal generation circuit 201 demodulates a carrier wave whose modulation factor is 100%, and the second demodulation signal generation circuit 202 demodulates a carrier wave whose modulation factor is 10% and a carrier wave whose modulation factor is 100%. Note that a regulator circuit, a limiter circuit, or the like may be added to a right place of the analog circuit 104 in order to stabilize the operation of the semiconductor device 100.

The logic circuit 106 of FIG. 2 will be described in detail with reference to FIG. 1. The logic circuit 106 includes the selector circuit 109, a control circuit 131, and the memory control circuit 132.

A demodulation signal (hereinafter also referred to as a first demodulation signal) from the first demodulation signal generation circuit 201 and a demodulation signal (hereinafter also referred to as a second demodulation signal) from the second demodulation signal generation circuit 202 are input to the selector circuit 109. The selector circuit 109 is controlled by the control circuit 131 through a selection line. The selector circuit 109 selects the demodulation signal from the first demodulation signal generation circuit 201 or the demodulation signal from the second demodulation signal generation circuit 202, and outputs the selected demodulation signal to the control circuit 131.

The memory control circuit 132 generates an address signal in accordance with an enable (EN) signal which is input from the control circuit 131, and writes data to the memory circuit 108 and reads data from the memory circuit 108 through an address line.

The control circuit 131 generates a signal to be transmitted to the modulation circuit 204 in accordance with data obtained by accessing the memory circuit 108. In addition, the control circuit 131 generates an enable (EN) signal and outputs it to the memory control circuit 132.

The control circuit 131 may include a decode circuit which decodes the demodulation signal from the first demodulation signal generation circuit 201 or the demodulation signal from the second demodulation signal generation circuit 202, or an encode circuit which encodes data obtained from the memory circuit 108. In addition, the control circuit 131 may include an information judging circuit which analyzes and judges an instruction in accordance with the demodulated signal. The information judging circuit may have a cyclic redundancy checking (CRC) function which identifies a transmission error.

Figure 1:
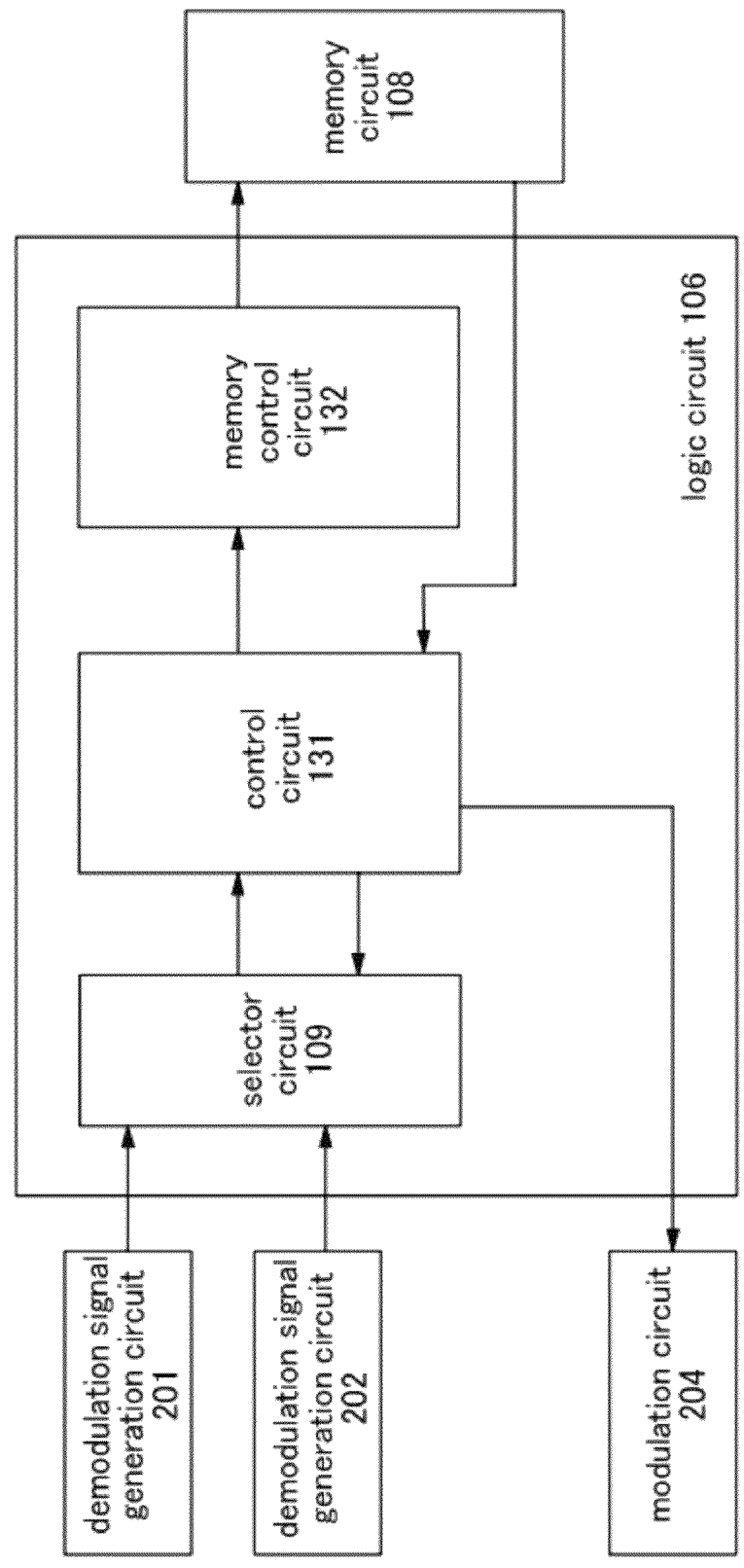
FIG. 1 illustrates an example of a semiconductor device according to one embodiment of the present invention.

An operation of the logic circuit 106 of FIG. 1 is described below. The selector circuit 109 is controlled by the control circuit 131 so as to select the demodulation signal from the first demodulation signal generation circuit 201 or the demodulation signal from the second demodulation signal generation circuit 202. "HIGH" in describing the operation below represents a state that the selector circuit 109 is controlled so as to select the demodulation signal from the first demodulation signal generation circuit 201. "LOW" in describing the operation below represents a state that the selector circuit 109 is controlled so as to select the demodulation signal from the second demodulation signal generation circuit 202.

When the semiconductor device 100 exists in a range where the semiconductor device 100 is operated by a magnetic field that is generated by the reader/writer 110, the control circuit 131 is fixed to LOW, and the semiconductor device 100 receives a signal from the reader/writer 110. Next, when the semiconductor device 100 receives an end of frame (hereinafter referred to as EOF) signal which indicates termination of an instruction from the reader/writer 110, the control circuit 131 is set to HIGH, and counting of the EOF signal is started using a reference clock.

Next, when a count value of the EOF signal reaches a given value, the control circuit 131 is set to LOW, and the semiconductor device 100 receives a signal from the reader/writer 110.

Here, specifications of standards are different between the transmission of an EOF signal with a carrier wave whose modulation factor is 100% and the transmission of an EOF signal with a carrier wave whose modulation factor is 10%. When the EOF signal whose modulation factor is 100% is transmitted by the reader/writer 110, a period which is sandwiched between the EOF signal transmitted from the reader/writer 110 and the next EOF signal (hereinafter the period is referred to as a slot) needs standard response time (corresponds to a period which is necessary for response from the semiconductor device 100) plus 323.3 μs. On the other hand, when the EOF signal whose modulation factor is 10% is transmitted, the slot needs a period which is necessary for transmission of a start of frame (also referred to as SOF) signal (the period corresponds to a period which is necessary for part of response from the semiconductor device 100) plus 323.3 μs.

Whether the count value of the EOF signal reaches the given value is determined by measurement of the standard response time. During the standard response time, a signal of the first demodulation signal generation circuit 201 is selected. Accordingly, even when a transmission signal (response signal of the semiconductor device 100) from the semiconductor device 100 to the reader/writer 110 is received by the semiconductor device 100, the transmission signal is not demodulated again. In addition, even when transmission signals from the other cards (chips) are received by the semiconductor device 100, the transmission signals are not demodulated by the second demodulation signal generation circuit (or the first demodulation signal generation circuit). On the other hand, a carrier wave whose modulation factor is 100%, which is transmitted from the reader/writer 110, can be demodulated by the first demodulation signal generation circuit 201.

After the standard response time, the signal of the second demodulation signal generation circuit 202 is selected until the next EOF signal is received by the semiconductor device 100. Therefore, both the carrier wave whose modulation factor is 10% and the carrier wave whose modulation factor is 100% which are transmitted from the reader/writer 110 can be demodulated.

As described above, the semiconductor device of this embodiment includes the first demodulation signal generation circuit 201 which demodulates a carrier wave whose modulation factor is 100%, the second demodulation signal generation circuit 202 which demodulates a carrier wave whose modulation factor is 10% and a carrier wave whose modulation factor is 100%, and the logic circuit 106 which selects the demodulation signal from the first demodulation signal generation circuit 201 or the demodulation signal from the second demodulation signal generation circuit 202. The semiconductor device of this embodiment can demodulate both the carrier wave whose modulation factor is 100% and the carrier wave whose modulation factor is 10%.

In addition, when the antenna circuit 102 transmits a signal to the reader/writer 110, a signal demodulated in the first demodulation signal generation circuit 201 is selected, and when the antenna circuit 102 receives a signal from the reader/writer 110, a signal demodulated in the second demodulation signal generation circuit 202 is selected. Therefore, even when the semiconductor device 100 receives a transmission signal to the reader/writer 110, the transmission signal is not demodulated again, so that the operation of the semiconductor device 100 is not hindered by the transmission signal. Thus, in the card (or chip) on which the semiconductor device 100 is mounted, the card can be prevented from being disabled or malfunctioning due to the card itself, and data can be stably transmitted and received to and from the reader/writer.

In addition, when the antenna circuit 102 transmits a signal to the reader/writer 110, the signal demodulated in the first demodulation signal generation circuit 201 is selected, and when the antenna circuit 102 receives a signal from the reader/writer 110, the signal demodulated in the second demodulation signal generation circuit 202 is selected. Therefore, even in the case where there is a plurality of cards (or chips) other than a card on which the semiconductor device 100 is mounted (hereinafter referred to as one card) in a range where the one card is operated by a magnetic field that is generated by the reader/writer 110, transmission signals from the other cards are not demodulated even when the transmission signals are received by the one card. Thus, the one card can be prevented from being disabled or malfunctioning due to the other cards, whereby data can be stably transmitted and received to and from the reader/writer 110.

Note that in the case where there is not different card (or chip) in a range where a card is operated by a magnetic field that is generated by the reader/writer 110, the control circuit 131 may have a function of selecting a signal of the second demodulation signal generation circuit 202.

An example of the structure of the power supply circuit 112 of FIG. 3 will be described with reference to FIG. 4. The power supply circuit 112 includes a first capacitor 300, a rectification portion 302 provided with two diodes, a smoothing capacitor 304, and a delay circuit 306 provided with a resistor and a capacitor. The power supply circuit 112 smoothes the output signal from the antenna circuit 102 and generates the power supply voltage and the reset signal of the logic circuit. The power supply voltage is adjusted so as to have a stable potential having a certain potential difference from a reference potential (a potential of a reference line).

The modulation circuit 204 modulates a carrier wave transmitted from the reader/writer 110 in accordance with a signal which is output from the logic circuit 106, and transmits a response signal to the antenna circuit 102.

The first demodulation signal generation circuit 201 demodulates data included in a 100% ASK signal included in an induced voltage which is generated in the antenna circuit 102. The second demodulation signal generation circuit 202 demodulates data included in a 100% ASK signal and data included in a 10% ASK signal which are included in an induced voltage which is generated in the antenna circuit 102.

Figure 5:
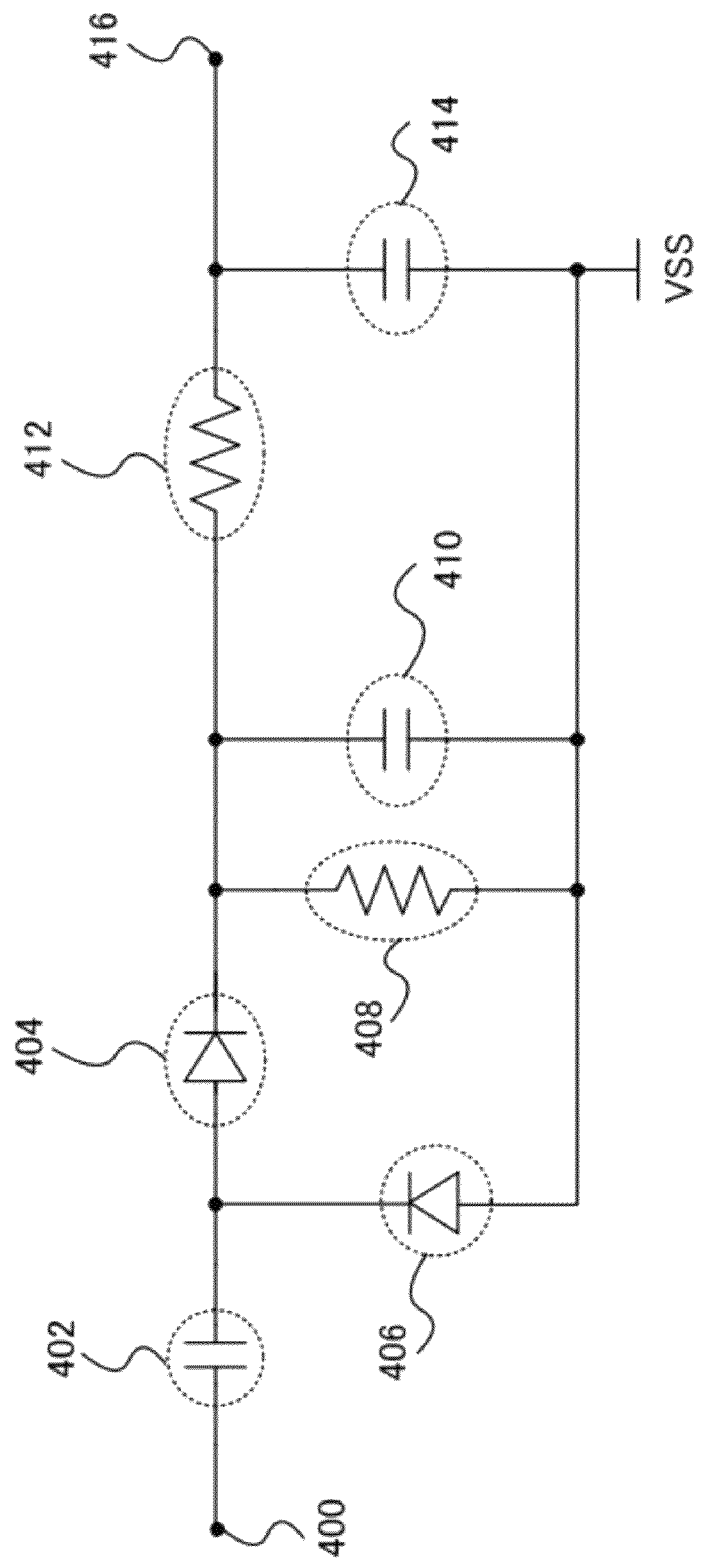
FIG. 5 illustrates an example of a first demodulation signal generation circuit of a semiconductor device according to one embodiment of the present invention.

An example of the structure of the first demodulation signal generation circuit 201 of FIG. 3 will be described with reference to FIG. 5. The first demodulation signal generation circuit 201 includes the input portion 400, the output portion 416, the first diode 404, the second diode 406, the first resistor 408, the second resistor 412, the first capacitor 402, the second capacitor 410, and the third capacitor 414.

The input portion 400 is connected to one end of the first capacitor 402. The other end of the first capacitor 402 is connected to an anode of the first diode 404 and a cathode of the second diode 406. A cathode of the first diode 404 is connected to each of one ends of the first resistor 408, the second capacitor 410, and the second resistor 412. The other end of the second resistor 412 is connected to one end of the third capacitor 414 and the output portion 416. Further, an anode of the second diode 406, each of the other ends of the first resistor 408, the second capacitor 410, and the third capacitor 414 are connected to a reference potential ($V_{SS}$).

An example of the structure of the second demodulation signal generation circuit 202 of FIG. 3 will be described with reference to FIG. 6. Note that FIGS. 7A to 7E, FIG. 9, and FIG. 10 are also referred to for description. The second demodulation signal generation circuit 202 includes an input portion 500, an output portion 514, a first demodulation circuit 502, a second demodulation circuit 504, a first bias circuit 506, a second bias circuit 508, a comparator 510, and an analog buffer circuit 512. Although an example of these circuit configurations provided in the second demodulation signal generation circuit 202 is described below, this embodiment is not limited to the following description.

The input portion 500 of the second demodulation signal generation circuit 202 is connected to an input portion 600 of the first demodulation circuit 502 and an input portion 620 of the second demodulation circuit 504. An output portion 616 of the first demodulation circuit 502 is connected to an input portion 800A of the first bias circuit 506, and an output portion 636 of the second demodulation circuit 504 is connected to an input portion 800B of the second bias circuit 508. An output portion 808A of the first bias circuit 506 is connected to a first input portion 900A of the comparator 510, and an output portion 808B of the second bias circuit 508 is connected to a second input portion 900B of the comparator 510. An output portion 912 of the comparator 510 is connected to the output portion 514 of the second demodulation signal generation circuit 202.

Note that the first demodulation circuit 502 and the second demodulation circuit 504 are included in the second demodulation signal generation circuit 202, and a polarity of electric signal demodulated in the first demodulation circuit 502 is opposite to that of electric signal demodulated in the second demodulation circuit 504.

Figure 6:
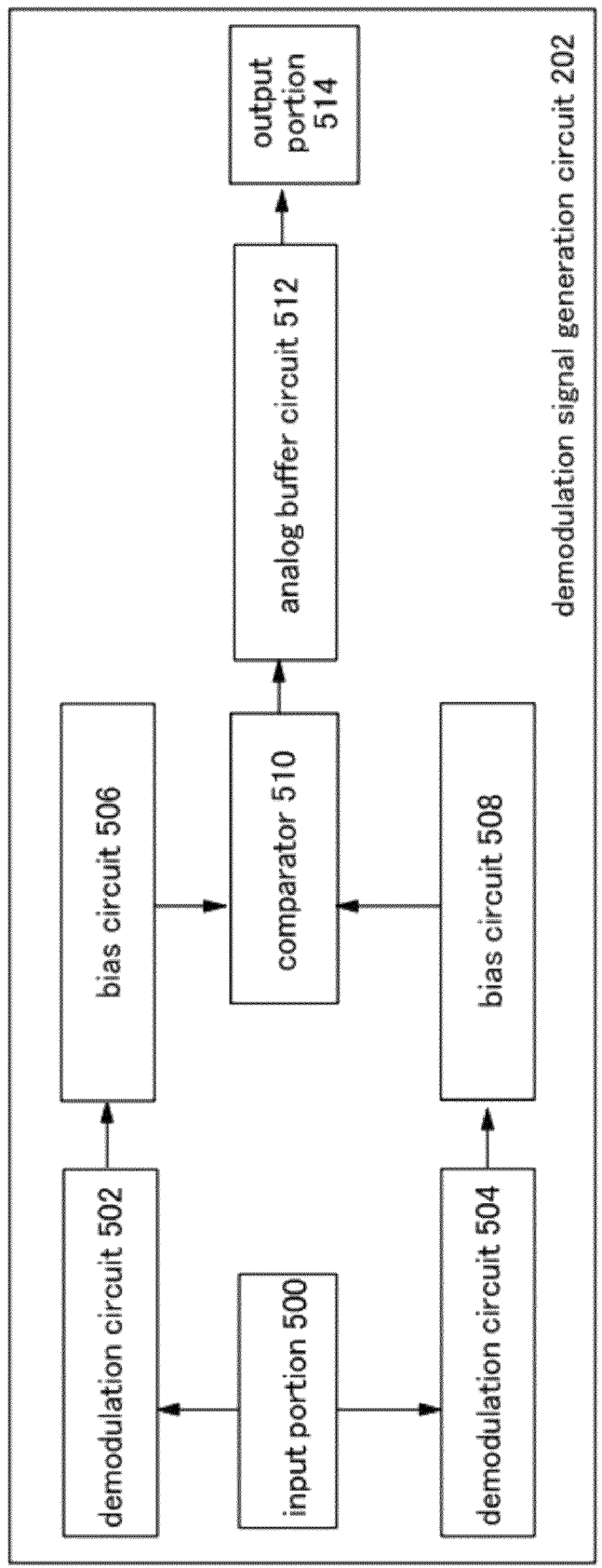
FIG. 6 illustrates an example of a second demodulation signal generation circuit of a semiconductor device according to one embodiment of the present invention.

Note that the output portion 912 of the comparator 510 and the output portion 514 of the second demodulation signal generation circuit 202 are preferably connected to each other through an analog buffer circuit 512 as illustrated in FIG. 6. As the analog buffer circuit 512, a source follower circuit, a common source amplifier circuit, a constant current circuit, and the like can be given. Noise can be removed more effectively and a demodulation signal can be generated stably by providing the analog buffer circuit 512.

Figure 7A:
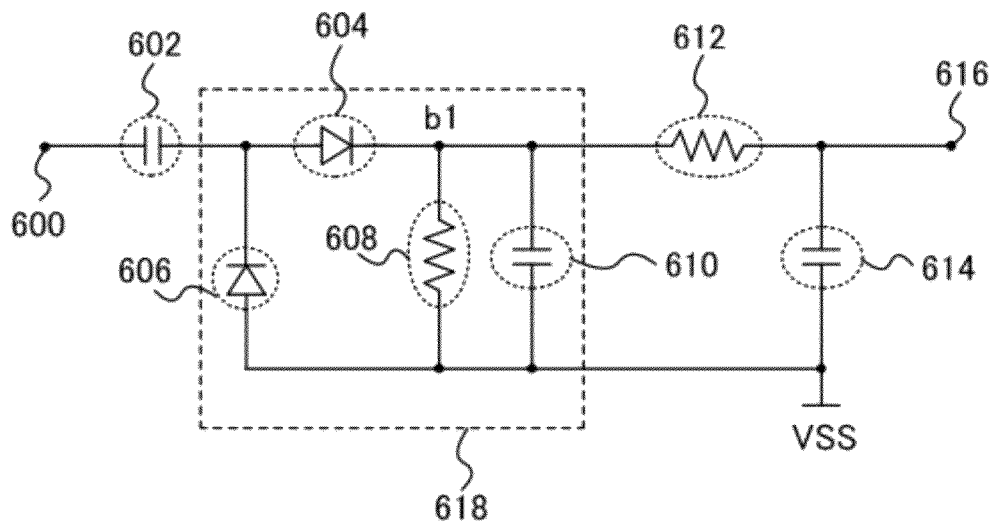
FIGS. 7A and 7B each illustrate an example of a first and a second demodulation circuit of a semiconductor device, and 7C to 7E each illustrate an example of a semiconductor device according to one embodiment of the present invention.

FIGS. 7A to 7E each illustrate an example of a structure of a demodulation circuit which is used as each of the first demodulation circuit 502 and the second demodulation circuit 504 of FIG. 6. FIG. 7A illustrates the first demodulation circuit 502. The first demodulation circuit 502 includes the input portion 600, the output portion 616, a first diode 604, a second diode 606, a first resistor 608, a second resistor 612, a first capacitor 602, a second capacitor 610, and a third capacitor 614.

The input portion 600 is connected to one end of the first capacitor 602. The other end of the first capacitor 602 is connected to an anode of the first diode 604 and a cathode of the second diode 606. A cathode of the first diode 604 is connected to each of one ends of the first resistor 608, the second capacitor 610, and the second resistor 612. The other end of the second resistor 612 is connected to one end of the third capacitor 614 and the output portion 616. Further, an anode of the second diode 606, each of the other ends of the first resistor 608, the second capacitor 610, and the third capacitor 614 are connected to a reference potential ($V_{SS}$).

Figure 7B:
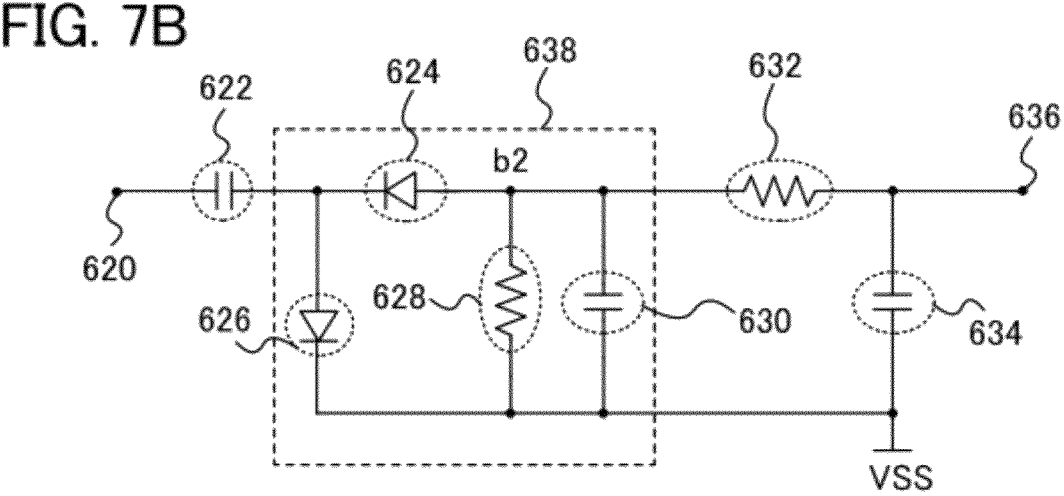

FIG. 7B illustrates the second demodulation circuit 504. The second demodulation circuit 504 includes the input portion 620, the output portion 636, a first diode 624, a second diode 626, a first resistor 628, a second resistor 632, a first capacitor 622, a second capacitor 630, and a third capacitor 634. The input portion 620 is connected to one end of the first capacitor 622. The other end of the first capacitor 622 is connected to a cathode of the first diode 624 and an anode of the second diode 626. An anode of the first diode 624 is connected to each of one ends of the first resistor 628, the second capacitor 630, and the second resistor 632. The other end of the second resistor 632 is connected to one end of the third capacitor 634 and the output portion 636. Further, a cathode of the second diode 626, each of the other ends of the first resistor 628, the second capacitor 630, and the third capacitor 634 are connected to a reference potential ($V_{SS}$).

The first diode 604 and the second diode 606 of FIG. 7A, and the first diode 624 and the second diode 626 of FIG. 7B may be formed of diode-connected TFTs.

Figure 7C:
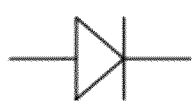
Figure 7D:
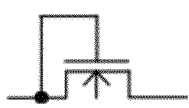
Figure 7E:
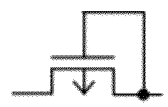
Figure 8A:
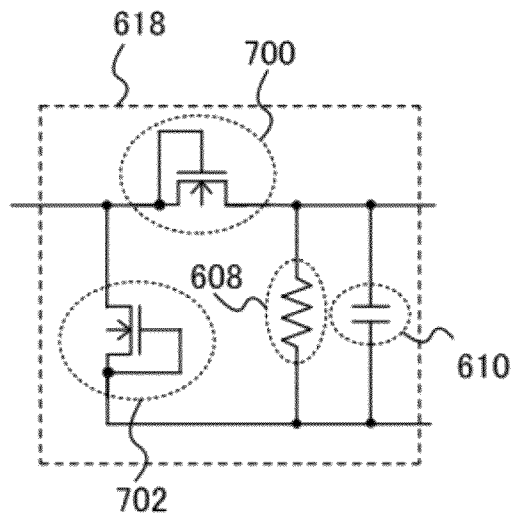
FIGS. 8A and 8B each illustrate an example of part of the first demodulation circuit formed using any of the TFTs illustrated in FIGS. 7D and 7E, and 8C and 8D each illustrate an example of part of the second demodulation circuit formed using any of the TFTs illustrated in FIGS. 7D and 7E according to one embodiment of the present invention.
Figure 8B:
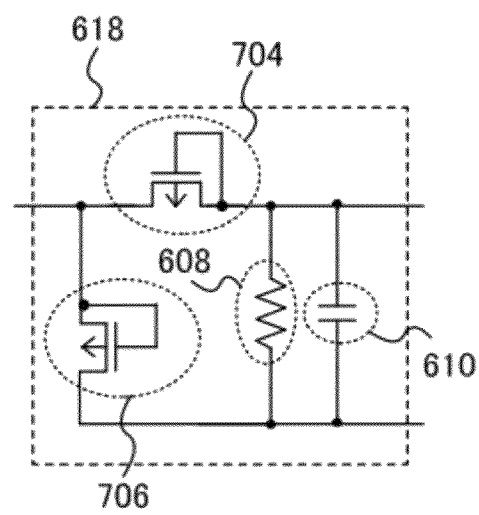

A diode illustrated in FIG. 7C, a diode-connected n-channel TFT illustrated in FIG. 7D, and a diode-connected p-channel TFT illustrated in FIG. 7E are equivalent as a circuit. FIGS. 8A and 8B each illustrate an example in which a circuit 618, which is part of the first demodulation circuit 502, illustrated in FIG. 7A is formed using any of the TFTs illustrated in FIGS. 7D and 7E. Similarly, FIGS. 8C and 8D each illustrate an example in which a circuit 638, which is part of the second demodulation circuit 504, illustrated in FIG. 7B is formed using any of the TFTs illustrated in FIGS. 7D and 7E.

In the circuit illustrated in FIG. 8A, n-channel TFTs 700 and 702 are used as diode-connected TFTs. In the circuit illustrated in FIG. 8B, p-channel TFTs 704 and 706 are used as diode-connected TFTs. In the circuit illustrated in FIG. 8C, n-channel TFTs 708 and 710 are used as diode-connected TFTs. In the circuit illustrated in FIG. 8D, p-channel TFTs 712 and 714 are used as diode-connected TFTs.

Figure 8C:
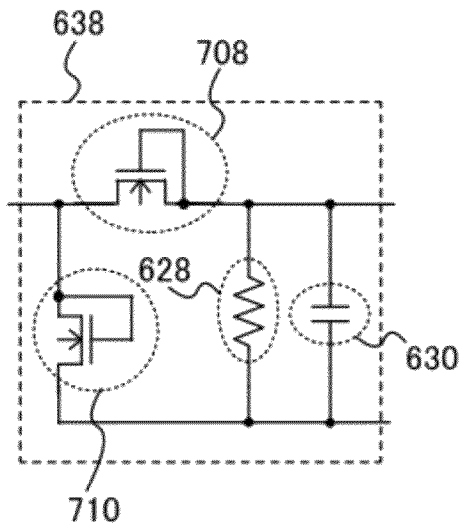
Figure 8D:
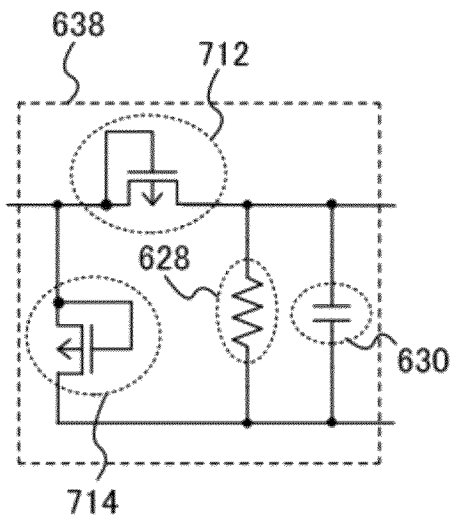

The first demodulation circuit 502 and the second demodulation circuit 504 may be formed by combination of the circuits illustrated in FIGS. 7A to 7E and FIGS. 8A to 8D. The first demodulation circuit 502 having the circuit 618 illustrated in FIG. 8A and the second demodulation circuit 504 having the circuit 638 illustrated in FIG. 8C may be used, or the first demodulation circuit 502 having the circuit 618 illustrated in FIG. 8B and the second demodulation circuit 504 having the circuit 638 illustrated in FIG. 8C may be used. Alternatively, the first demodulation circuit 502 having the circuit 618 illustrated in FIG. 8B and the second demodulation circuit 504 having the circuit 638 illustrated in FIG. 8D may be used. Preferably, the circuit 618 illustrated in FIG. 8A is used for the first demodulation circuit 502, and the circuit 638 illustrated in FIG. 8C is used for the second demodulation circuit 504. In general, carriers of an n-channel TFT have higher mobility than those of a p-channel TFT. Therefore, n-channel TFTs are used for all TFTs included in the first demodulation circuit 502 and the second demodulation circuit 504, so that operation performance of the circuits can be improved.

The first capacitor 602 illustrated in FIG. 7A (or the first capacitor 622 illustrated in FIG. 7B) compensates center of a wave amplitude (a reference line). The first resistor 608 (or the first resistor 628) makes a constant current flowing through a point b1 (or a point b2). Further, the second capacitor 610 (or the second capacitor 630) is provided to smooth a waveform. The resistivity of the first resistor 608 (or the first resistor 628) is adjusted as appropriate depending on the degree of electrostatic capacitance of the second capacitor 610 (or the second capacitor 630). When the resistivity of the first resistor 608 (or the first resistor 628) is small, amplitude is reduced; and when the resistivity is excessive, a breakdown phenomenon of the second diode 606 (or the second diode 626) occurs; thus, the semiconductor device does not operate normally. Furthermore, the second resistor 612 (or the second resistor 632) and the third capacitor 614 (or the third capacitor 634) function as a low-pass filter which removes a high-frequency component.

Figure 9:
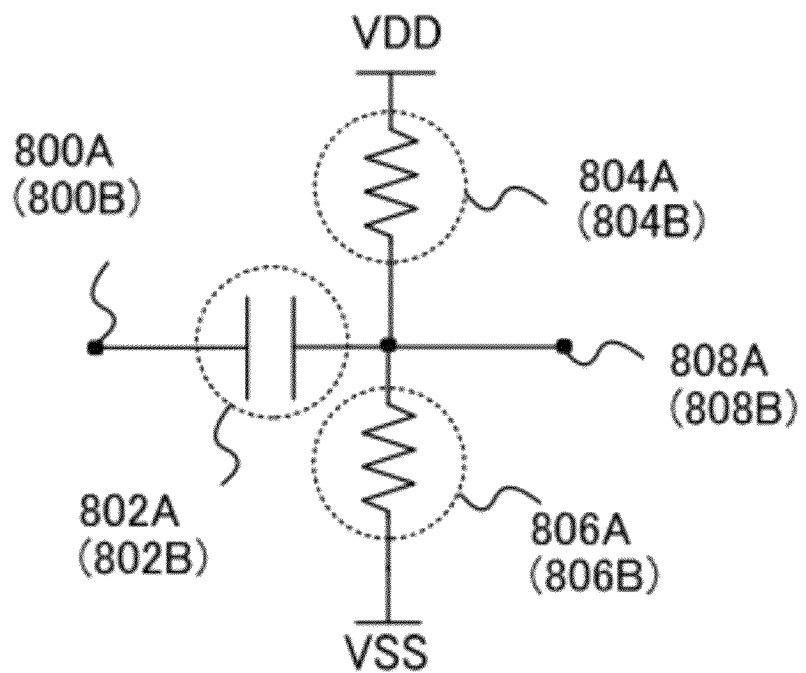
FIG. 9 illustrates an example of a bias circuit of a semiconductor device according to one embodiment of the present invention.

FIG. 9 illustrates an example of a structure of the first bias circuit 506 and the second bias circuit 508 of FIG. 6. As for a bias circuit illustrated in FIG. 9, an input portion (hereinafter referred to as the input portion 800A in a first bias circuit and the input portion 800B in a second bias circuit) is connected to one end of a capacitor (hereinafter referred to as a capacitor 802A in the first bias circuit and a capacitor 802B in the second bias circuit). The other end of the capacitor is connected to each of one ends of a first resistor (hereinafter referred to as a first resistor 804A in the first bias circuit and a first resistor 804B in the second bias circuit) and a second resistor (hereinafter referred to as a second resistor 806A in the first bias circuit and a second resistor 806B in the second bias circuit), and is connected to an output portion (hereinafter referred to as the output portion 808A in the first bias circuit and the output portion 808B in the second bias circuit). The other end of the first resistor is connected to a power supply potential ($V_{DD}$), and the other end of the second resistor is connected to a reference potential ($V_{SS}$).

The capacitor isolates the input portion galvanically from the power supply potential to which the first resistor is connected.

The first resistor and the second resistor are provided to generate a difference between potentials of signals which are input into the first input portion 900A and the second input portion 900B included in the comparator 510. Resistivity $R_{1A}$ of the first resistor 804A, resistivity $R_{1B}$ of the first resistor 804B, resistivity $R_{2A}$ of the second resistor 806A, and resistivity $R_{2B}$ of the second resistor 806B satisfy $R_{1A} \neq R_{2A}$ and $R_{1B} \neq R_{2B}$. Preferably, $R_{1A} = R_{2B}$ and $R_{1B} = R_{2A}$. Malfunction in the comparator 510, which results from noise, can be prevented when the comparator 510 has the first bias circuit 506 and the second bias circuit 508.

Figure 10:
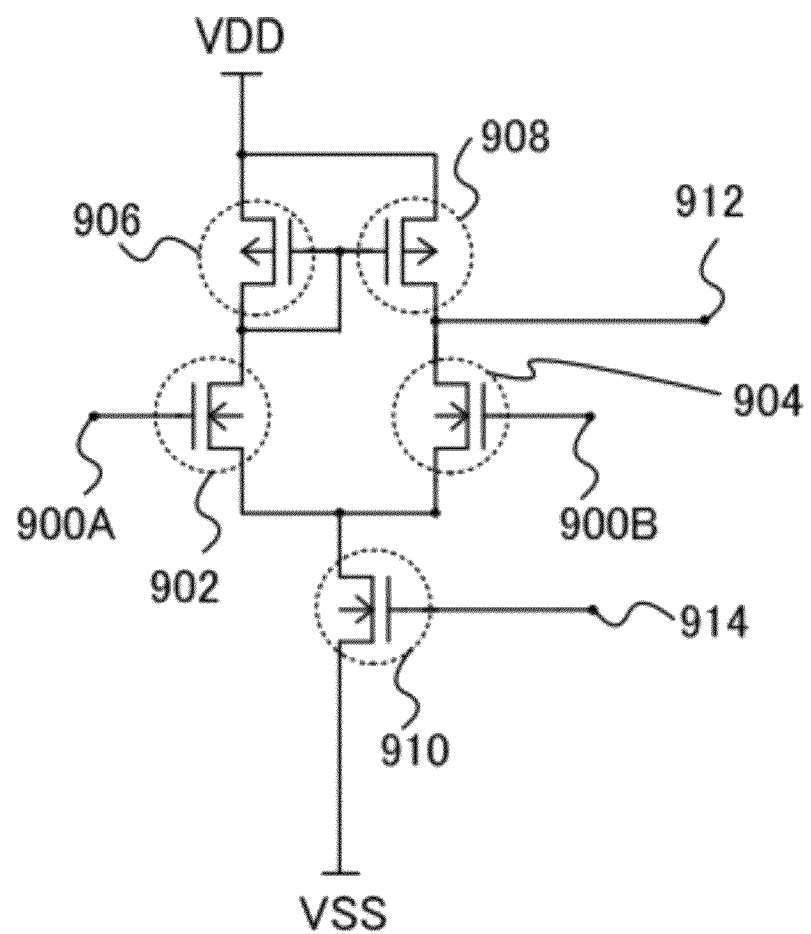
FIG. 10 illustrates an example of a comparator of a semiconductor device according to one embodiment of the present invention.

An example of the structure of the comparator 510 of FIG. 6 will be described with reference to FIG. 10. The comparator 510 includes a circuit having a function of comparing two signals, such as a differential circuit, a differential amplifier, or an operational amplifier. The comparator 510 includes the first input portion 900A, the second input portion 900B, a first TFT 902 (n-channel), a second TFT 904 (n-channel), a third TFT 906 (p-channel), a fourth TFT 908 (p-channel), a fifth TFT 910 (n-channel), and the output portion 912.

In the comparator 510, the first input portion 900A is connected to the output portion 808A of the first bias circuit 506, and the second input portion 900B is connected to the output portion 808B of the second bias circuit 508. The first input portion 900A is connected to a gate electrode of the first TFT 902 (n-channel), and the second input portion 900B is connected to a gate electrode of the second TFT 904 (n-channel). One of a source electrode and a drain electrode of the first TFT 902 (n-channel) is connected to one of a source electrode and a drain electrode of the fifth TFT 910 (n-channel) and one of a source electrode and a drain electrode of the second TFT 904 (n-channel). The other of the source electrode and the drain electrode of the first TFT 902 (n-channel) is connected to one of a source electrode and a drain electrode of the third TFT 906 (p-channel), a gate electrode of the third TFT 906 (p-channel), and a gate electrode of the fourth TFT 908 (p-channel). The other of the source electrode and the drain electrode of the third TFT 906 (p-channel) is connected to the power supply potential ($V_{DD}$). One of a source electrode and a drain electrode of the fourth TFT 908 (p-channel) is connected to the power supply potential ($V_{DD}$). The other of the source electrode and the drain electrode of the fourth TFT 908 (p-channel) is connected to the output portion 912 and the other of the source electrode and the drain electrode of the second TFT 904 (n-channel). A gate electrode of the fifth TFT 910 (n-channel) is connected to a constant current circuit 1003 of an analog buffer circuit (see FIG. 11A) or a constant current circuit 1023 (see FIG. 11B) through a wiring 914. The other of the source electrode and the drain electrode of the fifth TFT 910 (n-channel) is connected to a reference potential ($V_{SS}$).

Hereinafter, an operation of the comparator 510 is described.

A current which flows through the fifth TFT 910 (n-channel) which is a constant current source of the comparator 510 is set $I_d$. Here, since the third TFT 906 (p-channel) and the fourth TFT 908 (p-channel) form a current mirror circuit, a current of $I_d/2$ flows between the source electrode and the drain electrode of each of the third TFT 906 (p-channel) and the fourth TFT 908 (p-channel).

Here, the case where a different potential is applied to two TFTs which form a differential pair is described. First, the case where a potential of the first input portion 900A is higher than a potential of the second input portion 900B is considered. A current which flows through the first TFT 902 (n-channel) and the second TFT 904 (n-channel) is expressed by the following formula (1). Here, $V_{gs}$ is a gate voltage; $V_{ds}$, a drain voltage; $V_{th}$, a threshold voltage; k, transconductance coefficient; and λ, channel length modulation coefficient.

[Formula 1]

$$I_{ds} = \frac{I_d}{2} = k(V_{gs} - V_{th})^2(1 + \lambda \cdot V_{ds}) \quad (1)$$

Since a potential of the first input portion 900A is higher than a potential of the second input portion 900B in the formula (1), the following relation is formed between $V_{gs}$ (902) which is the gate voltage of the first TFT 902 (n-channel) and $V_{gs}$ (904) which is the gate voltage of the second TFT 904 (n-channel): $V_{gs}$ (902)>$V_{gs}$ (904). The transconductance coefficient k is a value unique (a constant) to a TFT which is determined by a carrier mobility, a capacitance of a gate insulating film, a channel width, and a channel length of a channel formation region of each of the TFTs, and the channel length modulation coefficient $\lambda$ is a constant which is determined by manufacturing processes of each of the TFTs. Therefore, when the transconductance coefficients k and the channel length modulation coefficients $\lambda$ of the first TFT 902 (n-channel) and the second TFT 904 (n-channel) are equivalent, the following relation is formed between the drain voltage $V_{ds}$ of the first TFT 902 (n-channel) and the drain voltage $V_{ds}$ of the second TFT 904 (n-channel): $V_{ds}$ (902)<$V_{ds}$ (904). Next, when the case where a potential of the first input portion 900A is lower than a potential of the second input portion 900B is considered similarly to the above, the following relation is formed between the drain voltage $V_{ds}$ of the first TFT 902 (n-channel) and the drain voltage $V_{ds}$ of the second TFT 904 (n-channel): $V_{ds}$ (902)>$V_{ds}$ (904).

As described above, the potential of the output portion 912 fluctuates depending on the magnitude relation of potentials of the input portion 900A and the input portion 900B.

Note that the comparator 510 is not limited to the above configuration, and any configuration may be employed as long as a function similar to the above can be obtained.

Next, an example of the circuit configuration of the analog buffer circuit 512 of FIG. 6 will be described with reference to FIGS. 11A and 11B. The analog buffer circuit of FIG. 11A includes an input portion 1000, a wiring 1006, a source follower circuit 1001, an inverter circuit 1002, the constant current circuit 1003, an inverter circuit 1004, and an output portion 1005. The wiring 1006 is connected to the wiring 914 of the comparator 510. The output portion 1005 is connected to the output portion 514 of the second demodulation signal generation circuit 202.

Figure 11A:
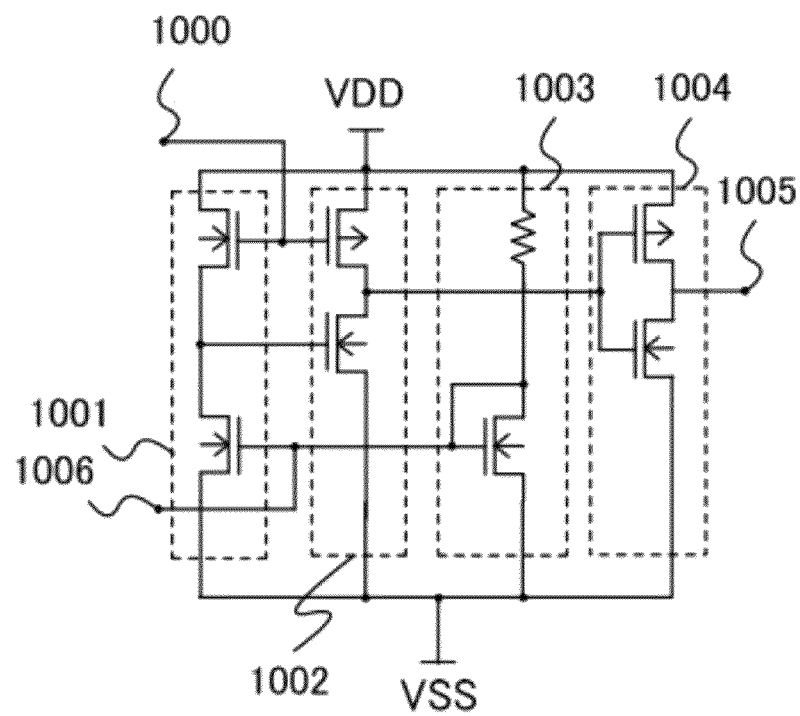
FIGS. 11A and 11B each illustrate an example of an analog buffer circuit of a semiconductor device according to one embodiment of the present invention.
Figure 11B:
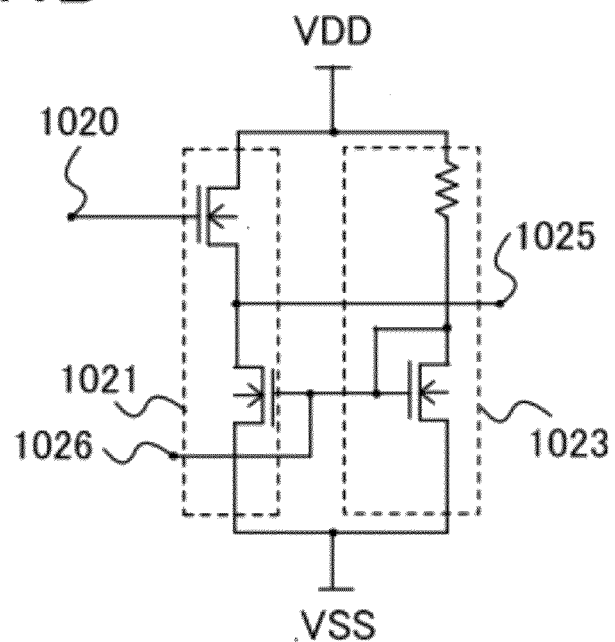

An analog buffer circuit of FIG. 11B includes an input portion 1020, a wiring 1026, a source follower circuit 1021, the constant current circuit 1023, and an output portion 1025. The wiring 1026 is connected to the wiring 914 of the comparator 510. The output portion 1025 is connected to the output portion 514 of the second demodulation signal generation circuit 202.

Noise can be removed more effectively and a demodulation signal can be generated stably by providing such an analog buffer circuit 512 as illustrated in FIG. 11A or 11B.

The selective circuit 109 which processes the first demodulation signal and the second demodulation signal is described with reference to FIG. 12.

Figure 12:
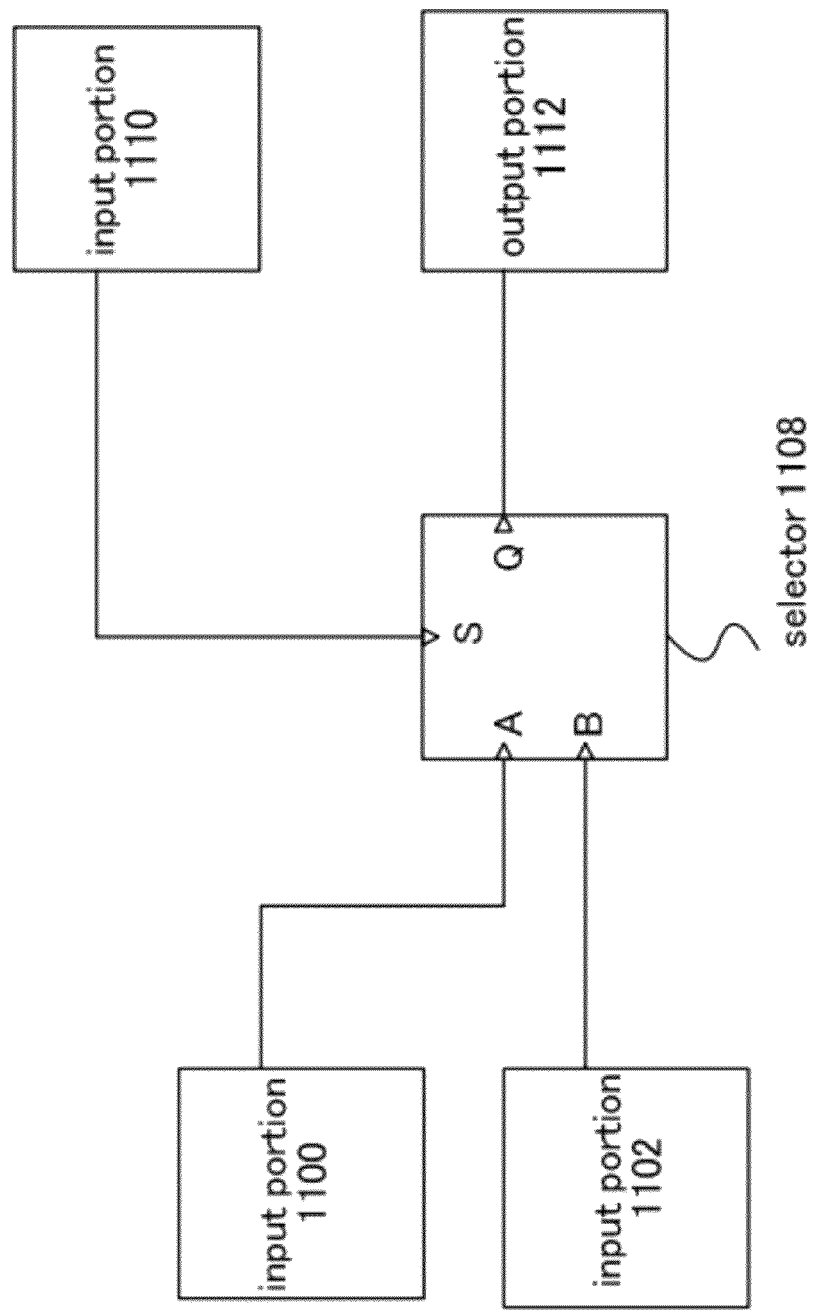
FIG. 12 illustrates an example of a selector circuit of a semiconductor device according to one embodiment of the present invention.

The selector circuit 109 illustrated in FIG. 12 includes a first input portion 1100, a second input portion 1102, a third input portion 1110, and an output portion 1112.

The first input portion 1100 is connected to an A terminal of a selector 1108, and the second input portion 1102 is connected to a B terminal of the selector 1108. Note that connections to the A and B terminals of the selector 1108 are not limited thereto. The first input portion 1100 may be connected to the B terminal of the selector 1108, and the second input portion 1102 may be connected to the A terminal of the selector 1108. The third input portion 1110 is connected to an S terminal of the selector 1108. A Q terminal which is an output portion of the selector 1108 is connected to the output portion 1112.

The operation of the selector circuit 109 of FIG. 12 will be described. "HIGH" in describing the operation represents a potential state the same as a power supply potential, and "LOW" represents a potential state the same as a reference potential.

One of a signal of the first input portion 1100 and a signal of the second input portion 1102 is selected in accordance with a potential state ("HIGH" or "LOW") of the third input portion 1110, and the selected signal is output to the output portion 1112. The selected signal is output from the output portion 1112 to another logic circuit.

Next, the selector 1108 is described. The selector 1108 selects the A terminal or the B terminal by a potential of the S terminal, and a potential of the selected terminal is output to the Q terminal. For example, in a configuration where a potential of the A terminal is output to the Q terminal when a potential of the S terminal is HIGH, a potential of the B terminal is output to the Q terminal if a potential of the S terminal is LOW. Here, the terminal A is selected when a potential of the S terminal is HIGH and the B terminal is selected when a potential of the S terminal is LOW; however, a relation between a potential of the S terminal and selection of the A terminal or the B terminal is not limited to the above and can be freely set.

As described above, the semiconductor device of this embodiment includes a first demodulation signal generation circuit which demodulates a carrier wave whose modulation factor is 100%, a second demodulation signal generation circuit which demodulates a carrier wave whose modulation factor is 10% and a carrier wave whose modulation factor is 100%, and a logic circuit which selects a demodulation signal from the first demodulation signal generation circuit or a demodulation signal from the second demodulation signal generation circuit. The semiconductor device of this embodiment can demodulate both the carrier wave whose modulation factor is 100% and the carrier wave whose modulation factor is 10%.

In addition, when the antenna circuit 102 transmits a signal to the reader/writer 110, a signal demodulated in the first demodulation signal generation circuit is selected, and when the antenna circuit 102 receives a signal from the reader/writer 110, a signal demodulated in the second demodulation signal generation circuit is selected. Therefore, even when the semiconductor device receives a transmission signal to the reader/writer, the transmission signal is not demodulated again, so that the operation of the semiconductor device is not hindered by the transmission signal. Thus, in the card (or chip) on which the semiconductor device is mounted, the card can be prevented from being disabled or malfunctioning due to the card itself, and data can be stably transmitted and received to and from the reader/writer.

In addition, when the antenna circuit 102 transmits a signal to the reader/writer 110, the signal demodulated in the first demodulation signal generation circuit is selected, and when the antenna circuit 102 receives a signal from the reader/writer 110, the signal demodulated in the second demodulation signal generation circuit is selected. Therefore, even in the case where there is a plurality of cards (or chips) other than a card on which the semiconductor device is mounted (hereinafter referred to as one card) in a range where the one card is operated by a magnetic field that is generated by the reader/writer, transmission signals from the other cards are not demodulated even when the transmission signals are received by the one card. Thus, the one card can be prevented from being disabled or malfunctioning due to the other cards, whereby data can be stably transmitted and received to and from the reader/writer.

Embodiment 2

This embodiment will describe an example of a structure of a semiconductor device in a mode which is different from Embodiment 1. Specifically, this embodiment will employ a structure in which the semiconductor device described in Embodiment 1 is provided with a battery.

Figure 15:
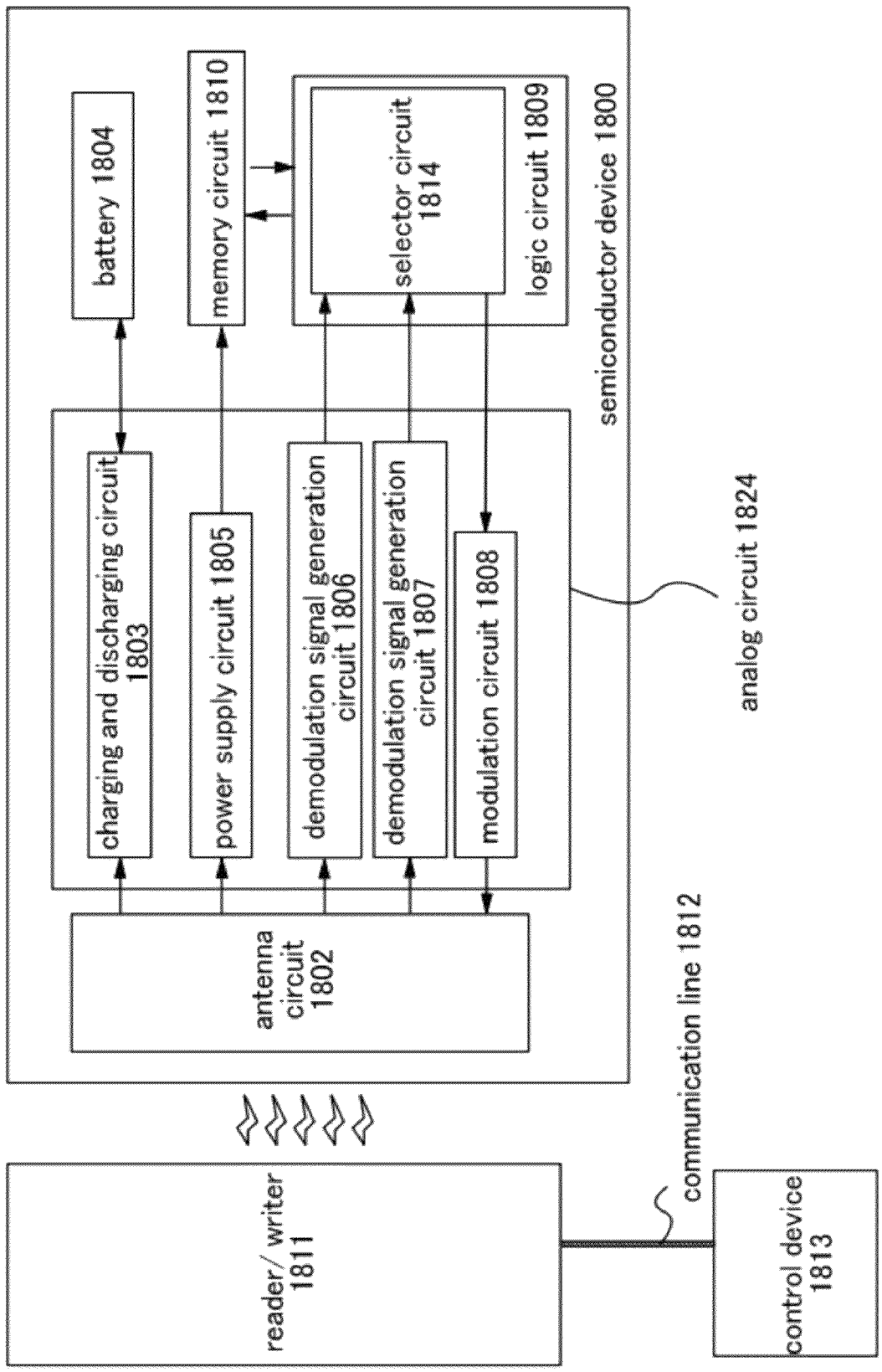
FIG. 15 illustrates an example of a semiconductor device according to one embodiment of the present invention.

A semiconductor device of this embodiment is illustrated in FIG. 15. In FIG. 15, a semiconductor device 1800 transmits and receives data wirelessly to and from a reader/writer 1811 by an electromagnetic wave. Further, the semiconductor device 1800 is wirelessly supplied with power from the reader/writer 1811.

The reader/writer 1811 is preferably connected to a control device 1813 through a communication line 1812. The control device 1813 controls communication between the reader/writer 1811 and the semiconductor device 1800.

The semiconductor device 1800 includes an antenna circuit 1802, an analog circuit 1824, a logic circuit 1809, a memory circuit 1810, and a battery 1804. The analog circuit 1824 includes a charging and discharging circuit 1803, a power supply circuit 1805, a first demodulation signal generation circuit 1806, a second demodulation signal generation circuit 1807, and a modulation circuit 1808. The logic circuit 1809 includes a selector circuit 1814.

Alternatively, the semiconductor device 1800 does not include an antenna but does include a wiring used to connect to an external antenna. In this case, the antenna which is separately manufactured is connected to the wiring. A connection terminal (a terminal electrode) which is electrically connected to the wiring may be used to connect the wiring and the antenna.

Note that the semiconductor device 1800 is not limited to the above structure, and may include a clock generation circuit, a central processor unit (hereinafter referred to as a CPU), or the like.

Note that the clock generation circuit refers to a circuit which generates and supplies to each circuit a clock signal having a frequency necessary for operations of the logic circuit 1809, the memory circuit 1810, and the like based on an AC induced voltage which is generated in the antenna circuit 1802. An oscillation circuit or a frequency divider circuit may be used for the clock generation circuit.

In the semiconductor device 1800 of this embodiment, an electromagnetic wave from the reader/writer 1811 is received and power by the electromagnetic wave is supplied to drive the semiconductor device. Therefore, although a passive-type semiconductor device is described in this embodiment, this embodiment is not limited thereto. As a structure in which a cell is contained inside the semiconductor device, power may be supplied from the cell to drive the semiconductor device.

In the electromagnetic wave transmitted from the reader/writer 1811, a carrier wave having a certain frequency is modulated from a sub-carrier wave. A signal included in the sub-carrier wave is a binarized digital signal which is transmitted to the semiconductor device 1800 from the reader/writer 1811. As to a modulation method of a carrier wave, there are an amplitude shift keying (ASK) modulation method which changes amplitude, a frequency shift keying (FSK) modulation method which changes a frequency, and a phase shift keying (PSK) modulation method which changes a phase. This embodiment describes the case in which an electromagnetic wave modulated by the ASK modulation method is demodulated.

The antenna circuit 1802 includes an antenna and a capacitor. The antenna circuit 1802 receives a radio wave (or an electromagnetic wave) which is transmitted from the reader/writer 1811, and inputs the signal obtained at this time into each of the charging and discharging circuit 1803, the power supply circuit 1805, the first demodulation signal generation circuit 1806, and the second demodulation signal generation circuit 1807. Further, the antenna circuit 1802 receives a signal whose carrier wave is modulated from the modulation circuit 1808, and transmits a response signal to the reader/writer 1811.

The antenna circuit 1802 preferably having an antenna and a rectifier circuit receives an electromagnetic wave, which is transmitted from the reader/writer 1811, and generates an AC induced voltage. The induced voltage becomes power from a power supply of the semiconductor device 1800 and also includes data transmitted from the reader/writer 1811.

The shape of the antenna that can be used for this embodiment is not particularly limited. Therefore, a signal transmission method applied to the antenna circuit 1802 included in the semiconductor device 1800 can be an electromagnetic coupling method, an electromagnetic induction method, a radio wave method, or the like. The transmission method may be selected as appropriate by a practitioner in consideration of the intended use of the device. Thus, an antenna with an optimum length and shape may be provided in accordance with the transmission method. In this embodiment, an electromagnetic induction method having a communication frequency of 13.56 MHz is preferably used as the signal transmission method.

In the case of applying an electromagnetic coupling method or an electromagnetic induction method (for example, a 13.56 MHz band) as the transmission method, a conductive film which functions as the antenna is formed in an annular form (for example, a loop antenna) or a helical form (for example, a spiral antenna) in order to utilize electromagnetic induction that occurs with a change of the electric field density.

In the case of using a microwave method (for example, UHF band (860 MHz to 960 MHz), 2.45 GHz band, or the like) which is one kind of radio wave methods as the transmission method, the length and shape of the conductive film which functions as the antenna may be set as appropriate in consideration of the wavelength of radio waves used for the signal transmission. For example, the conductive film which functions as an antenna can be formed into a linear shape (for example, a dipole antenna), a flat shape (for example, a patch antenna), or the like. The shape of the conductive film which functions as the antenna is not limited to a linear shape, and the conductive film which functions as the antenna may be formed in a curved-line shape, a meander shape, or a combination thereof, in consideration of a wavelength of an electromagnetic wave.

Note that the shape of the antenna provided in the antenna circuit 1802, and a method for connecting a chip provided with a signal processing circuit and the antenna are similar to those of the antenna provided in the antenna circuit 102 included in the semiconductor device 100 of Embodiment 1 (see FIGS. 13A to 13E). Therefore, the detailed descriptions are omitted in this embodiment.

In addition, the antenna circuit 1802 may have a plurality of antennas. An antenna which is used to transmit and receive data with respect to an electromagnetic wave from the reader/ writer 1811 can be separately provided from an antenna which supplies power with respect to an electromagnetic wave from the reader/writer 1811 when the antenna circuit 1802 has a plurality of antennas. Further, a radio wave or the like which is transmitted from other than the reader/writer 1811 (other readers/writers or the like) can be received when the antenna circuit 1802 has a plurality of antennas of which frequency bands to receive are each different from one another. Therefore, the radio wave can be efficiently utilized for power supply.

The power supply circuit 1805 rectifies the induced voltage, which is generated in the antenna circuit 1802, by a diode or the like, and stabilizes the induced voltage with the use of a capacitor, thereby adjusting so as to maintain a stable potential having a certain potential difference from a reference potential (a potential of a reference line).

The logic circuit 1809 selects a first demodulation signal which is output from the first demodulation signal generation circuit 1806 or a second demodulation signal which is output from the second demodulation signal generation circuit 1807. Further, the logic circuit 1809 performs the following operations in accordance with the selected demodulated signal: analyzing instructions; controlling input and output of data in the memory circuit 1810; outputting data to be transmitted to the outside to the modulation circuit 1808; and the like. The logic circuit 1809 preferably includes a decoding circuit, an information judging circuit, or the like, in addition to a circuit which generates a signal for controlling the memory circuit 1810. Further, the logic circuit 1809 may include a circuit which converts part or all of data extracted from the memory circuit 1810, which is transmitted from the semiconductor device 1800 to the reader/writer 1811, into an encoded signal.

The logic circuit 1809 of this embodiment has a structure similar to that of the logic circuit 106 of Embodiment 1. Therefore, the detailed descriptions are omitted in this embodiment.

The memory circuit 1810 includes a memory element and stores at least unique data (individual identification information or the like) in the semiconductor device 1800. Writing and reading of data in the memory circuit 1810 are controlled by a memory control circuit included in the logic circuit 1809.

The memory circuit 1810 includes one or more of an organic memory, a dynamic random access memory (DRAM), a static random access memory (SRAM), a ferroelectric random access memory (FeRAM), a mask read only memory (ROM), a programmable read only memory (PROM), an electrically programmable read only memory (EPROM), an electrically erasable programmable read only memory (EEPROM), and a flash memory.

An organic memory has a simple structure in which a layer including an organic compound is interposed between a pair of conductive layers; therefore, it has at least two advantages. One is that a manufacturing process can be simplified, which allows cost reduction. The other advantage is that it is easy to reduce the area of the memory circuit and that an increase in capacitance can be realized easily because a stack which is easily downsized is used. Therefore, it is preferable to use the organic memory for the memory circuit 1810.

As long as the memory content of the memory element is unique data (individual identification information or the like) in the semiconductor device 1800, a nonvolatile memory which can store memory without being supplied with power is preferably used. On the other hand, as long as temporary memory used in processing performed by the semiconductor device 1800 is stored, a volatile memory may be used. Particularly in the case of a so-called passive type in which the semiconductor device 1800 has no cell, a nonvolatile memory is preferably used. Further, in consideration of security, a non-rewritable memory is preferably used to store the unique data in the semiconductor device 1800.

The first demodulation signal generation circuit 1806 and the second demodulation signal generation circuit 1807 demodulate and extract data included in the induced voltage which is generated in the antenna circuit 1802. The first demodulation signal generation circuit 1806 and the second demodulation signal generation circuit 1807 which are included in the semiconductor device 1800 of this embodiment are similar to the first demodulation signal generation circuit 201 and the second demodulation signal generation circuit 202 which are included in the semiconductor device 100 and described in Embodiment 1. Therefore, the detailed descriptions are omitted in this embodiment.

The modulation circuit 1808 transmits load modulation to the antenna circuit 1802 in accordance with a signal from the logic circuit 1809.

Signals demodulated in the first demodulation signal generation circuit 1806 and the second demodulation signal generation circuit 1807 are input into the logic circuit 1809, individual identification information or the like stored in the memory circuit 1810 is extracted by the logic circuit 1809, and the extracted information is encoded in the logic circuit 1809 and input into the modulation circuit 1808. The modulation circuit 1808 performs modulation in accordance with the input signals, and transmits information from the antenna circuit 1802 to the reader/writer 1811. The information received in the reader/writer 1811 is transmitted to the control device 1813 through the communication line 1812.

The charging and discharging circuit 1803 in FIG. 15 supplies power to each circuit included in the semiconductor device 1800. In addition, electricity is stored in the battery 1804 using the charging and discharging circuit 1803 by an external wireless signal which is input from the antenna circuit 1802 through the rectifier circuit provided in the antenna circuit 1802, and power can be supplied to each circuit using power stored in the battery 1804 through the charging and discharging circuit 1803. By using the power with which the battery 1804 is charged, the power supply circuit 1805 can be supplied with power even when sufficient power cannot be obtained from the antenna circuit 1802 of the semiconductor device 1800 in the case where a communication distance is extended. Therefore, the semiconductor device 1800 can be operated. Accordingly, a semiconductor device of this embodiment can be stably operated with certainty.

Note that a battery in this specification refers to a cell which can recover a continuous using time by charging. Note that a sheet-like cell is preferably used as the battery. For example, the battery can be made smaller by using a lithium cell, preferably a lithium polymer cell using a gel-like electrolyte, a lithium ion cell, or the like. Naturally, any cell can be used as the battery as long as it can be charged, and a cell which can be charged and discharged such as a nickel metal hydride cell or a nickel cadmium cell may be used, or a capacitor having high capacity or the like may be used.

As described above, in the semiconductor device of this embodiment, when the antenna circuit 102 transmits a signal to the reader/writer 110, a demodulation signal from the first demodulation signal generation circuit is selected, and when the antenna circuit 102 receives a signal from the reader/writer 110, a demodulation signal from the second demodulation signal generation circuit is selected. Therefore, even when the semiconductor device receives a transmission signal to the reader/writer, the transmission signal is not demodulated again, so that the operation of the semiconductor device is not hindered by the transmission signal. Thus, in a card (or chip) on which the semiconductor device is mounted, the card can be prevented from being disabled or malfunctioning due to the card itself, and data can be stably transmitted and received to and from the reader/writer.

In addition, when the antenna circuit 102 transmits a signal to the reader/writer 110, the signal demodulated in the first demodulation signal generation circuit is selected, and when the antenna circuit 102 receives a signal from the reader/writer 110, the signal demodulated in the second demodulation signal generation circuit is selected. Therefore, even in the case where there is a plurality of cards (or chips) other than a card on which the semiconductor device is mounted (hereinafter referred to as one card) in a range where the one card is operated by a magnetic field that is generated by the reader/writer, transmission signals from the other cards are not demodulated even when the transmission signals are received by the one card. Thus, the one card can be prevented from being disabled or malfunctioning due to the other cards, whereby data can be stably transmitted and received to and from the reader/writer.

Similarly to a conventional semiconductor device, the semiconductor device of this embodiment includes a battery; therefore, shortage of power for transmitting and receiving unique information, due to deterioration of a cell over time, can be compensated. In particular, in the semiconductor device of this embodiment, a comparator which needs a large amount of power is provided in the second demodulation signal generation circuit, whereby it is highly effective to provide a battery as described in this embodiment.

The semiconductor device of this embodiment may include a plurality of antennas for wirelessly receiving power for the battery. Therefore, the battery for supplying power for driving the semiconductor device can be charged with external electromagnetic waves without directly being connected to a charger. As a result, unlike a conventional active-type RFID tag, it is not necessary to check remaining capacity of a cell or change cells, so that the semiconductor device can be continued to be used for long periods of time and over the long term. In addition, power for driving the semiconductor device is constantly stored in a battery, so that sufficient power for driving the semiconductor device can be obtained and a communication distance between a reader/writer and the semiconductor device can be increased.

Note that a battery is described as an example of a power storage portion in this embodiment; however, the semiconductor device can be formed using a capacitor instead of the battery. Although various capacitors can be used, a small and high-capacity double-layer electrolytic capacitor or a small and high-capacity stacked-layer ceramic capacitor is preferably used. Alternatively, both a battery and a capacitor may also be provided as the power storage portion.

Embodiment 3

A semiconductor device which is manufactured by applying any of the foregoing embodiments can be used for various objects and systems utilizing a function of transmitting or receiving electromagnetic waves. Examples in which a semiconductor device 2000 using any of the foregoing embodiments is mounted are illustrated in FIGS. 14A to 14F.

As items having the semiconductor device of any of the foregoing embodiments, the following items are given: keys (see FIG. 14A), paper money, coins, securities, bearer bonds, certificates (such as a driver's license or a resident's card, see FIG. 14B), books, containers (such as a Petri dish, see FIG. 14C), packaging containers (such as wrapping paper or bottles, see FIGS. 14E and 14F), recording media (such as a disk or video tape), vehicles (such as a bicycle), personal accessories (such as bags or eyeglasses, see FIG. 14D), food, clothing, livingware, electronic appliances (such as a liquid crystal display device, an EL display device, a television device, or a portable terminal), or the like. The semiconductor device of any of the foregoing embodiments is fixed by being attached to the surfaces of the objects having various shapes as described above, or being embedded into the objects.

Further, a system having the semiconductor device of any of the foregoing embodiments refers to a goods management system, a system having an authentication function, a distribution system, or the like.

Note that this embodiment can be implemented in combination with Embodiment 1 or Embodiment 2.

This application is based on Japanese Patent Application serial No. 2008-241436 filed with Japan Patent Office on Sep. 19, 2008, the entire contents of which are hereby incorporated by reference.

EXPLANATION OF REFERENCE

100: semiconductor device, 102: antenna circuit, 104: analog circuit, 106: logic circuit, 108: memory circuit, 109: selector circuit, 110: reader/writer, 112: power supply circuit, 114: modulation circuit, 118: communication line, 120: control device, 131: control circuit, 132: memory control circuit, 150: demodulation signal generation circuit, 201: demodulation signal generation circuit, 202: demodulation signal generation circuit, 204: modulation circuit, 206: input/output portion, 208: output portion, 210: output portion, 212: output portion, 214: output portion, 218: input portion, 300: capacitor, 302: rectification portion, 304: smoothing capacitor, 306: delay circuit, 400: input portion, 402: capacitor, 404: diode, 406: diode, 408: resistor, 410: capacitor, 412: resistor, 414: capacitor, 416: output portion, 500: input portion, 502: demodulation circuit, 504: demodulation circuit, 506: bias circuit, 508: bias circuit, 510: comparator, 512: analog buffer circuit, 514: output portion, 600: input portion, 602: capacitor, 604: diode, 606: diode, 608: resistor, 610: capacitor, 612: resistor, 614: capacitor, 616: output portion, 618: circuit, 620: input portion, 622: capacitor, 624: diode, 626: diode, 628: resistor, 630: capacitor, 632: resistor, 634: capacitor, 636: output portion, 638: circuit, 700: n-channel TFT, 702: n-channel TFT, 704: p-channel TFT, 706: p-channel TFT, 708: n-channel TFT, 710: n-channel TFT, 712: p-channel TFT, 714: p-channel TFT, 800A: input portion, 800B: input portion, 802A: capacitor, 802B: capacitor, 804A: resistor, 804B: resistor, 806A: resistor, 806B: resistor, 808A: output portion, 808B: output portion, 900A: input portion, 900B: input portion, 902: TFT, 904: TFT, 906: TFT, 908: TFT, 910: TFT, 912: output portion, 914: wiring, 1000: input portion, 1001: source follower circuit, 1002: inverter circuit, 1003: constant current circuit, 1004: inverter circuit, 1005: output portion, 1006: wiring, 1020: input portion, 1021: source follower circuit, 1023: constant current circuit, 1025: output portion, 1026: wiring, 1100: input portion, 1102: input portion, 1108: selector, 1110: input portion, 1112: output portion, 1200: chip, 1201: antenna, 1202: chip, 1203: antenna, 1204: chip, 1205: antenna, 1206: chip, 1207: antenna, 1208: chip, 1209: antenna, 1800: semiconductor device, 1802: antenna circuit, 1803: charging and discharging circuit, 1804: battery, 1805: power supply circuit, 1806: demodulation signal generation circuit, 1807: demodulation signal generation circuit, 1808: modulation circuit, 1809: logic circuit, 1810: memory circuit, 1811: reader/writer, 1812: communication line, 1813: control device, 1814: selector circuit, 1824: analog circuit, and 2000: semiconductor device.

The invention claimed is:

1. A semiconductor device comprising:
an antenna circuit which transmits and receives data;
a first demodulation signal generation circuit configured to demodulate a signal from the antenna circuit, whose modulation factor is greater than or equal to 95% and less than or equal to 100%;
a second demodulation signal generation circuit configured to demodulate a signal from the antenna circuit, whose modulation factor is greater than or equal to 95% and less than or equal to 100% and a signal from the antenna circuit, whose modulation factor is greater than or equal to 10% and less than or equal to 30%; and
a logic circuit configured to select one of the signal demodulated in the first demodulation signal generation circuit and the signal demodulated in the second demodulation signal generation circuit to modulate the signal selected by the logic circuit,
wherein the logic circuit is configured to select the signal demodulated in the first demodulation signal generation circuit when the antenna circuit transmits data, and
wherein the logic circuit is configured to select the signal demodulated in the second demodulation signal generation circuit when the antenna circuit receives data.

2. The semiconductor device according to claim 1,
wherein the logic circuit includes:
a selector circuit configured to select one of the signal demodulated in the first demodulation signal generation circuit and the signal demodulated in the second demodulation signal generation circuit; and
a control circuit configured to control the selector circuit.

3. The semiconductor device according to claim 1, further comprising a memory circuit and a modulation circuit,
wherein the logic circuit includes:
a selector circuit configured to select one of the signal demodulated in the first demodulation signal generation circuit and the signal demodulated in the second demodulation signal generation circuit;
a memory control circuit configured to read data from the memory circuit; and
a control circuit configured to control the selector circuit and the memory control circuit, and
wherein the control circuit is configured to generate a signal to be transmitted to the modulation circuit in accordance with the data read from the memory circuit.

4. The semiconductor device according to claim 1,
further comprising a battery in which electricity is stored by a signal which is input from the antenna circuit.

5. A card on which the semiconductor device according to claim 1 is mounted.

6. A semiconductor device comprising:
an antenna circuit which transmits and receives data;
a first demodulation signal generation circuit configured to demodulate a signal from the antenna circuit, whose modulation factor is greater than or equal to 95% and less than or equal to 100%;
a second demodulation signal generation circuit configured to demodulate a signal from the antenna circuit, whose modulation factor is greater than or equal to 95% and less than or equal to 100% and a signal from the antenna circuit, whose modulation factor is greater than or equal to 10% and less than or equal to 30%; and
a logic circuit configured to select one of the signal demodulated in the first demodulation signal generation circuit and the signal demodulated in the second demodulation signal generation circuit to modulate a signal from the antenna circuit,
wherein the second demodulation signal generation circuit includes:
a first demodulation circuit;
a second demodulation circuit; and
a comparator electrically connected to the first demodulation circuit and the second demodulation circuit,
wherein a polarity of electric signal demodulated in the first demodulation circuit is opposite to that of electric signal demodulated in the second demodulation circuit,
wherein the logic circuit is configured to select the signal demodulated in the first demodulation signal generation circuit when the antenna circuit transmits data, and
wherein the logic circuit is configured to select the signal demodulated in the second demodulation signal generation circuit when the antenna circuit receives data.

7. The semiconductor device according to claim 6,
wherein the second demodulation signal generation circuit includes:
a first bias circuit electrically connected to the first demodulation circuit and the comparator; and
a second bias circuit electrically connected to the second demodulation circuit and the comparator.

8. The semiconductor device according to claim 6,
wherein the second demodulation signal generation circuit includes an analog buffer circuit electrically connected to the comparator.

9. The semiconductor device according to claim 6,
wherein the logic circuit includes:
a selector circuit configured to select one of the signal demodulated in the first demodulation signal generation circuit and the signal demodulated in the second demodulation signal generation circuit; and
a control circuit configured to control the selector circuit.

10. The semiconductor device according to claim 6, further comprising a memory circuit and a modulation circuit,
wherein the logic circuit includes:
a selector circuit configured to select one of the signal demodulated in the first demodulation signal generation circuit and the signal demodulated in the second demodulation signal generation circuit;
a memory control circuit configured to read data from the memory circuit; and
a control circuit configured to control the selector circuit and the memory control circuit, and
wherein the control circuit is configured to generate a signal to be transmitted to the modulation circuit in accordance with the data read from the memory circuit.

11. The semiconductor device according to claim 6,
further comprising a battery in which electricity is stored by a signal which is input from the antenna circuit.

12. A card on which the semiconductor device according to claim 6 is mounted.

* * * * *